(12) United States Patent
Jang et al.

(10) Patent No.: US 12,216,883 B2
(45) Date of Patent: Feb. 4, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Useong Jang, Suwon-si (KR); Sanga Kim, Suwon-si (KR); Jaewoong Kim, Suwon-si (KR); Juneok Ahn, Suwon-si (KR); Yunkyeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/984,076

(22) Filed: Nov. 9, 2022

(65) Prior Publication Data
US 2023/0221834 A1 Jul. 13, 2023

Related U.S. Application Data

(63) Continuation of application No. PCT/KR2022/014342, filed on Sep. 26, 2022.

(30) Foreign Application Priority Data

Jan. 10, 2022 (KR) .................. 10-2022-0003454

(51) Int. Cl.
*G06F 3/0482* (2013.01)
*F24C 3/12* (2006.01)
(Continued)

(52) U.S. Cl.
CPC ............ *G06F 3/0482* (2013.01); *F24C 3/124* (2013.01); *F24C 7/082* (2013.01); *G06F 3/04847* (2013.01)

(58) Field of Classification Search
CPC .... G06F 3/0482; G06F 3/04847; F24C 3/124; F24C 7/082
See application file for complete search history.

(56) References Cited

U.S. PATENT DOCUMENTS 4,601,004 A * 7/1986 Holt .................. G05D 23/1951
374/170
10,388,141 B2 * 8/2019 Allen, Sr. .............. A47J 36/00
(Continued)

FOREIGN PATENT DOCUMENTS

CA      2771745 A1 * 9/2012 ........... F25D 29/008
CA      2771743 C  * 9/2019 ........... G06Q 10/087
(Continued)

OTHER PUBLICATIONS

Suriati, "Weighted hybrid technique for recommender system", IP Conf. Series: Journal of Physics: Conf. Series 930, 2017, retrieved Apr. 20, 2023. (Year: 2017).*

(Continued)

*Primary Examiner* — Shourjo Dasgupta
(74) *Attorney, Agent, or Firm* — Sughrue Mion, PLLC

(57) ABSTRACT

An electronic apparatus according to the disclosure includes a display; a manipulation interface; a memory configured to store a menu selection history including a first menu category of a first depth and a second menu category of a second depth subordinate to the first menu; and a processor configured to identify whether guide information is to be provided based on a user input selecting a first menu item received through the manipulation interface, and based on identifying the guide information is to be provided, control the display to display the guide information including a recommended menu item based on at least one of the first menu item, context information, or the menu selection history stored in the memory.

20 Claims, 28 Drawing Sheets

(51) Int. Cl.
    *F24C 7/08*          (2006.01)
    *G06F 3/04847*    (2022.01)

(56) References Cited

U.S. PATENT DOCUMENTS

| | | | |
|---|---|---|---|
| 10,936,163 | B2 | 3/2021 | Wohlstadter et al. |
| 11,372,523 | B2 | 6/2022 | Wohlstadter et al. |
| 11,437,134 | B2 | 9/2022 | Southam |
| 2004/0099144 | A1 | 5/2004 | Kudo et al. |
| 2005/0004953 | A1* | 1/2005 | Kurase .................. G06F 3/128 |
| 2010/0318576 | A1 | 12/2010 | Kim |
| 2014/0201664 | A1 | 7/2014 | Guilleminot et al. |
| 2014/0236622 | A1 | 8/2014 | Southam |
| 2014/0317501 | A1 | 10/2014 | Brasseur et al. |
| 2016/0327281 | A1 | 11/2016 | Bhogal et al. |
| 2017/0139385 | A1* | 5/2017 | Young .................... A47J 27/04 |
| 2017/0351419 | A1* | 12/2017 | Urban .................. G06F 40/117 |
| 2018/0129380 | A1* | 5/2018 | Suh ........................ C12C 13/00 |
| 2019/0006040 | A1* | 1/2019 | Fleming ............. G09B 19/0092 |
| 2019/0328175 | A1* | 10/2019 | Bancroft ............... A47J 36/321 |
| 2019/0385432 | A1* | 12/2019 | Allen, Sr. .............. A47J 36/00 |
| 2020/0026397 | A1 | 1/2020 | Wohlstadter et al. |
| 2020/0027056 | A1* | 1/2020 | Corona .................. F25D 29/00 |
| 2020/0143661 | A1* | 5/2020 | Allen, Sr. .......... A47J 37/0786 |
| 2021/0157408 | A1* | 5/2021 | Karimi Eskandary . G06F 3/016 |
| 2021/0240314 | A1 | 8/2021 | Wohlstadter et al. |

FOREIGN PATENT DOCUMENTS

| | | | | |
|---|---|---|---|---|
| CA | 2864741 | C * | 4/2023 | ........... A61B 5/4866 |
| CN | 104662580 | A * | 5/2015 | ........... A61B 5/02055 |
| CN | 104981963 | A * | 10/2015 | ........... F24F 11/0034 |
| CN | 107238113 | A * | 10/2017 | ........... F24C 15/2042 |
| CN | 107430626 | B * | 11/2019 | ........ G06F 16/2428 |
| CN | 110806903 | A * | 2/2020 | |
| CN | 110868967 | A * | 3/2020 | ............. G06F 1/163 |
| CN | 110942815 | A * | 3/2020 | |
| EP | 1382912 | A1 * | 1/2004 | ............. G06Q 30/06 |
| JP | 10-47686 | A | 2/1998 | |
| JP | 11-190521 | A | 7/1999 | |
| JP | 2003-269729 | A | 9/2003 | |
| JP | 2015-34694 | A | 2/2015 | |
| JP | 7468122 | B2 * | 4/2024 | ......... G06Q 30/0283 |
| KR | 10-2010-0132868 | A | 12/2010 | |
| KR | 10-1151176 | B1 | 6/2012 | |
| KR | 20160096289 | A * | 8/2016 | |
| KR | 10-2017-0036110 | A | 3/2017 | |
| KR | 10-2019-0029785 | A | 3/2019 | |
| KR | 10-2019-0064042 | A | 6/2019 | |
| KR | 10-2020-0104592 | A | 9/2020 | |
| KR | 102242648 | B1 | 4/2021 | |
| KR | 10-2021-0066253 | A | 6/2021 | |
| KR | 10-2021-0073512 | A | 6/2021 | |
| WO | 2008/045305 | A2 | 4/2008 | |
| WO | WO-2021204115 | A1 * | 10/2021 | ............. A47J 27/00 |
| WO | WO-2022045082 | A1 * | 3/2022 | ............. A61B 5/01 |

OTHER PUBLICATIONS

Sonal Linda, "Effective Context-Aware Recommendations Based on Context Weighting Using Genetics Algorithm and Alleviating Data Sparsity", Applied Artificial Intelligence, 34:10, 730-753, 2020, retrieved Apr. 20, 2023. (Year: 2020).*

Saloua Zammali, "A context features selecting and weighting methods for context-aware recommendation", 2015 IEEE 39th Annual International Computers, Software & Applications Conference, 2015, retrieved Apr. 20, 2023. (Year: 2015).*

Gediminas Adomavicius, "Toward the Next Generation of Recommender Systems: A Survey of the State-of-the-Art and Possible Extensions", IEEE Transactions on Knowledge and Data Engineering, vol. 17, No. 6, Jun. 2005, retrieved Apr. 20, 2023. (Year: 2005).*

Yong Zheng, "Recommendation with Differential Context Weighting", UMAP 2013, LNCS 7899, pp. 152-164, 2013, retrieved Apr. 20, 2023. (Year: 2013).*

Patricia Ortal, "Switching Hybrid Method Based on User Similarity and Global Statistics for Collaborative Filtering", published Nov. 25, 2020 via IEEE Access with Digital Object Identifier 10.1109/ACCESS.2020.3040432, retrieved Apr. 20, 2023. (Year: 2020).*

Anthony Figueroa, "The Magic behind Recomendation Systems", published May 18, 2020 at https://towardsdatascience.com/the-magic-behind-recommendation-systems-c3fc44927b3c, retrieved Apr. 20, 2023. (Year: 2020).*

F.O. Isinkaye, "Recommendation systems: Principles, methods and evaluation", Egyptian Informatics Journal, vol. 16, pp. 261-273, 2015, retrieved Apr. 20, 2023. (Year: 2015).*

Abhinav Ajitsaria, "Build a Recommendation Engine with Collaborative Filtering", published on Jul. 10, 2019 at https://realpython.com/build-recommendation-engine-collaborative-filtering, retrieved Apr. 20, 2023. (Year: 2019).*

Amel Hannech, "Recommendation Model Based on a Contextual Similarity Measure", 2016 15th IEEE International Conference on Machine Learning and Applications, retrieved Apr. 20, 2023. (Year: 2016).*

Ashwini Lokesh, "A Comparative Study of Recommendation Systems", Masters Theses & Specialist Projects, Paper 3166, 2019, retrieved Apr. 20, 2023. (Year: 2019).*

Finn Qiao, "Uncovering Online Delivery Menu Best Practices with Machine Learning", published on Nov. 10, 2020 to https://doordash.engineering/2020/11/10/uncovering-online-delivery-menu-best-practices-with-machine-learning, retrieved Oct. 11, 2023. (Year: 2020).*

International Search Report and Written Opinion (PCT/ISA/210 and PCT/ISA/237) issued on Jan. 20, 2023 by the International Searching Authority in International Application No. PCT/KR2022/014342.

Communication issued Nov. 6, 2024 by the European Patent Office in European Patent Application No. 22918975.8.

* cited by examiner

FIG. 8

| | TIME | TIME DIFFERENCE (s) | AVERAGE TIME DIFFERENCE(s) | CHANGE SPEED | AVERAGE CHANGE SPEED |
|---|---|---|---|---|---|
| FIRST USER INPUT | 14:00:01 | - | - | - | - |
| SECOND USER INPUT | 14:00:05 | 4 | 4 | 0.25 | 0.25 |
| THIRD USER INPUT | 14:00:15 | 10 | 7 | 0.1 | 0.18 |
| FOURTH USER INPUT | 14:00:16 | 1 | 5 | 1 | 0.45 |
| FIFTH USER INPUT | 14:00:17 | 1 | 4 | 1 | 0.59 |

810

FIG. 11
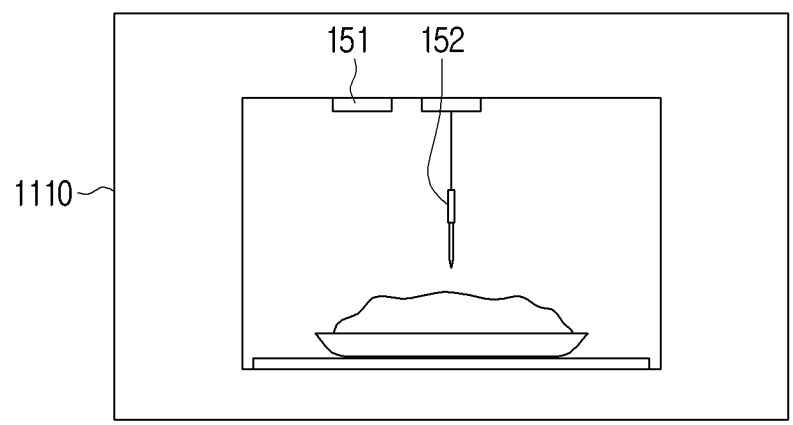
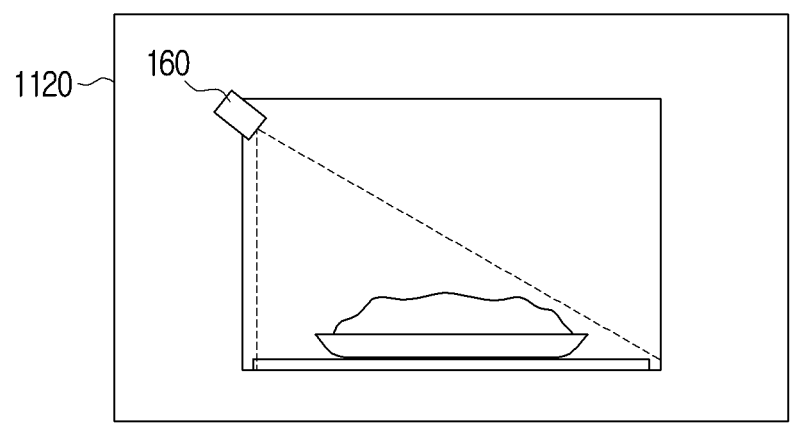

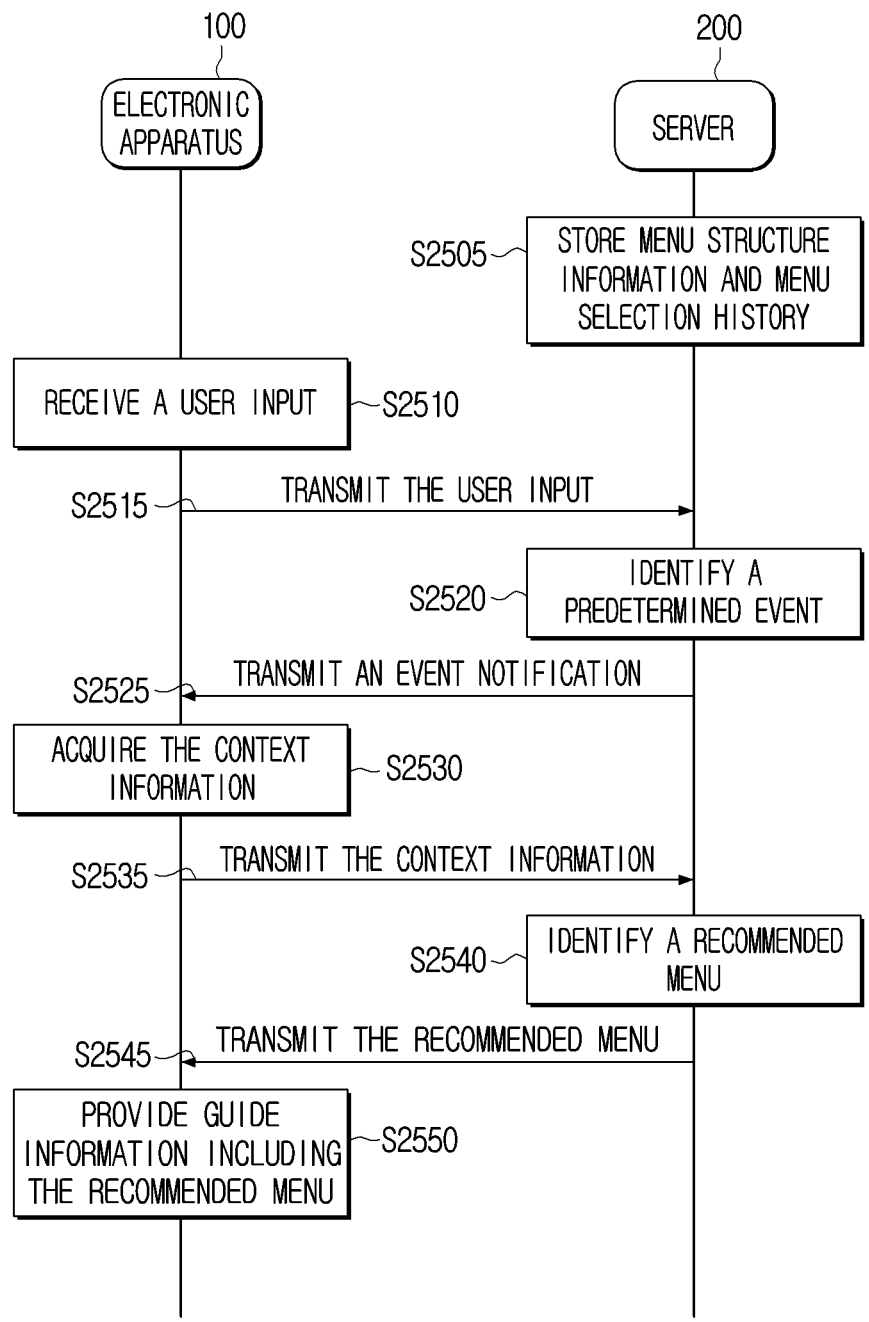

FIG. 26

| COOKING IDENTIFICATION INFORMATION | CATEGORY (60) | ASSOCIATED CATEGORY (30) | INTERNAL TEMPERATURE (5) | PROBE TEMPERATURE (5) | FUNCTION 1 (5) | FUNCTION 2 (5) | TIME (5) | DATE (5) | SELECTION HISTORY (40) |
|---|---|---|---|---|---|---|---|---|---|
| #01 | A | B | O | | O | | MORNING | WEEKDAY | O |
| #02 | A | C | | | | O | NOON | WEEKEND | O |
| #03 | A | - | O | | O | | EVENING | WEEKEND CHRISTMAS | O |
| ... | | | | | | | | | |
| #11 | B | A | | | O | | MORNING | WEEKDAY | O |
| #12 | B | C | O | | | O | NOON | WEEKEND | O |
| #13 | B | - | | | O | | EVENING | WEEKEND CHRISTMAS | O |
| ... | | | | | | | | | |
| #21 | C | A | O | O | O | | MORNING | WEEKDAY | O |
| #22 | C | B | | O | | O | NOON | WEEKEND | O |
| #23 | C | - | O | O | O | | EVENING | WEEKEND CHRISTMAS | O |
| ... | | | | | | | | | |

2610

ELECTRONIC APPARATUS AND CONTROLLING METHOD THEREOF

CROSS-REFERENCE TO RELATED APPLICATIONS

This application is a bypass continuation application of International Application No. PCT/KR2022/014342 designating the United States, filed on Sep. 26, 2022, in the Korean Intellectual Property Receiving Office, which claims priority to Korean Patent Application No. 10-2022-0003454 filed on Jan. 10, 2022, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus that provides a recommended menu based on a user input selecting a menu, and a controlling method thereof.

2. Description of Related Art

A user can perform a search to select a specific menu item among various menu items. For example, a user can search a specific menu item through a button, a dial, or a touch screen, etc. included in an electronic apparatus.

However, in a case in which there are many menu categories are provided by an electronic apparatus, a user may have difficulty in finding a particular desired menu item. For example, if a user searches for a menu item for cooking pizza, it may be difficult for the user to figure out a menu category to select.

Also, if many user inputs are necessary in a process of selecting a specific menu item, a user may feel inconvenience. For example, in a case, in which, a user who often uses a menu item for cooking pizza has to select a first menu item of a first menu category, a second menu item of a second menu category, and a menu category of a third menu category, the user may be inconvenienced by the cumbersome process. Here, the user who often uses a menu item for cooking pizza may need to repetitively select three different menu items in total, and also input the final start button to start the cooking process. In case the user repetitively uses the menu items, he may feel that it takes a long time to input four selection each time.

SUMMARY

One or more aspects of the disclosure may address or solve the aforementioned problem. According to an aspect of the disclosure, there is provided an electronic apparatus that generates and outputs, if it is identified that provision of guide information is necessary, guide information including a recommended menu item based on a user input, context information, and menu selection history, and a controlling method thereof.

According to an aspect of the disclosure, an electronic apparatus includes: a display: a manipulation interface; a memory configured to store a menu selection history including a first menu category of a first depth and a second menu category of a second depth subordinate to the first menu; and a processor configured to identify whether guide information is to be provided based on a user input selecting a first menu item received through the manipulation interface, and based on identifying the guide information is to be provided, control the display to display the guide information including a recommended menu item based on at least one of the first menu item, context information, or the menu selection history stored in the memory.

The processor may be further configured to identify the guide information is to be provided based on identifying at least one event among a first event, which occurs when an additional user input for selecting a second menu item is not received during a threshold time after the first item was selected, a second event, which occurs when a speed at which menu items are changed according to user inputs is greater than or equal to a threshold speed, or a third event, which occurs when the user selects to cancel a menu selection.

The context information may include at least one of temperature information inside the electronic apparatus, temperature information of an item to be cooked, information on whether a specific function is executed, image information inside the electronic apparatus, or date and time information.

The memory may be further configured to store a plurality of menu items, and the processor may be further configured to: acquire weights corresponding to the plurality of menu items stored in the memory based on the information on the first menu item, the context information, and the menu selection history, and identify the recommended menu item based on the weights corresponding to the plurality of menu items.

The processor may be further configured to: identify a selected menu item based on the first menu item, allot a first sub weight to a same menu item as the selected menu item among the plurality of menu items, allot a second sub weight to a similar menu item to the selected menu among the plurality of menu items, and sum up the first sub weight and the second sub weight to acquire the weights corresponding to the plurality of menu items.

The processor may be further configured to: identify a third sub weight to a menu item corresponding to the context information among the plurality of menu items, identify a fourth sub weight to a menu item corresponding to the menu selection history among the plurality of menu items, and sum up the first sub weight, the second sub weight, the third sub weight, and the fourth sub weight, to acquire the weights corresponding to the plurality of menu items.

The processor may be further configured to, based on identifying that the guide information is to be provided, identify the recommended menu item based on the first menu item, the context information, and the menu selection history, and control the display to display an icon for identifying the recommended menu item based on a location wherein the recommended menu item is displayed.

The processor may be further configured to, based on identifying that the guide information is to be provided, input the first menu item and the context information into a trained neural network model, and acquire the recommended menu item, and wherein the neural network model is trained based on the context information and the menu selection history.

The electronic apparatus may further include a heater configured to heat an item to be cooked, and the processor may be further configured to: based a user input selecting a second menu item included in the guide information received through the manipulation interface, perform a function corresponding to the selected second menu item, and the function corresponding to the selected menu may include: at least one of a function of displaying a text including a cooking process of the selected second menu item, a function of displaying an image including the cooking process of the selected second menu item, or a function of setting a schedule of the heater to perform the cooking process of the selected second menu item.

The electronic apparatus may further include: a contact-type temperature sensor configured to sense a temperature of the item to be cooked, and wherein the processor may be further configured to: based on identifying that the guide information is be provided, acquire the temperature of the item to be cooked as the context information through the contact-type temperature sensor, and identify the recommended menu item based on the first menu item, the context information including the temperature of the item to be cooked, and the menu selection history.

According to an aspect of the disclosure, a controlling method of an electronic apparatus, includes: storing menu selection history including a first menu category of a first depth and a second menu category of a second depth subordinate to the first menu; identifying whether guide information is to be provided based on a user input selecting a first menu item; and based on identifying that the guide information is to be provided, displaying the guide information including a recommended menu item based on at least one of the first menu item, context information, or the menu selection history stored in the memory.

The identifying whether guide information is to be provided may include identifying that the guide information is to be provided, based on identifying at least one event among a first event, which occurs when an additional user input for selecting a second menu item is not received during a threshold time after the first item was selected, a second event, which occurs when a speed at which menu items are changed according to user inputs is greater than or equal to a threshold speed, or a third event, which occurs when the user selects to cancel a menu selection.

The context information may include at least one of temperature information inside the electronic apparatus, temperature information of an item to be cooked, information on whether a specific function is executed, image information inside the electronic apparatus, or date and time information.

The controlling method may further include: acquiring weights corresponding to a plurality of menu items stored in the memory based on the information on the first menu item, the context information, and the menu selection history, and identifying the recommended menu item based on the weights corresponding to the plurality of menu items.

The acquiring weights corresponding to the plurality of respective menus may include: identifying a selected menu item based on the first menu item, allotting a first sub weight to a same menu item as the selected menu item among the plurality of menu items, allotting a second sub weight to a similar menu item to the selected menu among the plurality of menu items, and summing up the first sub weight and the second sub weight to acquire the weights corresponding to the plurality of menu items.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a table for illustrating a process of calculating a change speed of a menu;

FIG. 11 is a diagram for illustrating an operation of acquiring context information:

FIG. 25 is a flow chart for illustrating an operation of identifying a recommended menu item by using a server:

FIG. 26 is a table for illustrating weight information corresponding to each of a plurality of cooking:

DETAILED DESCRIPTION

Figure 1:
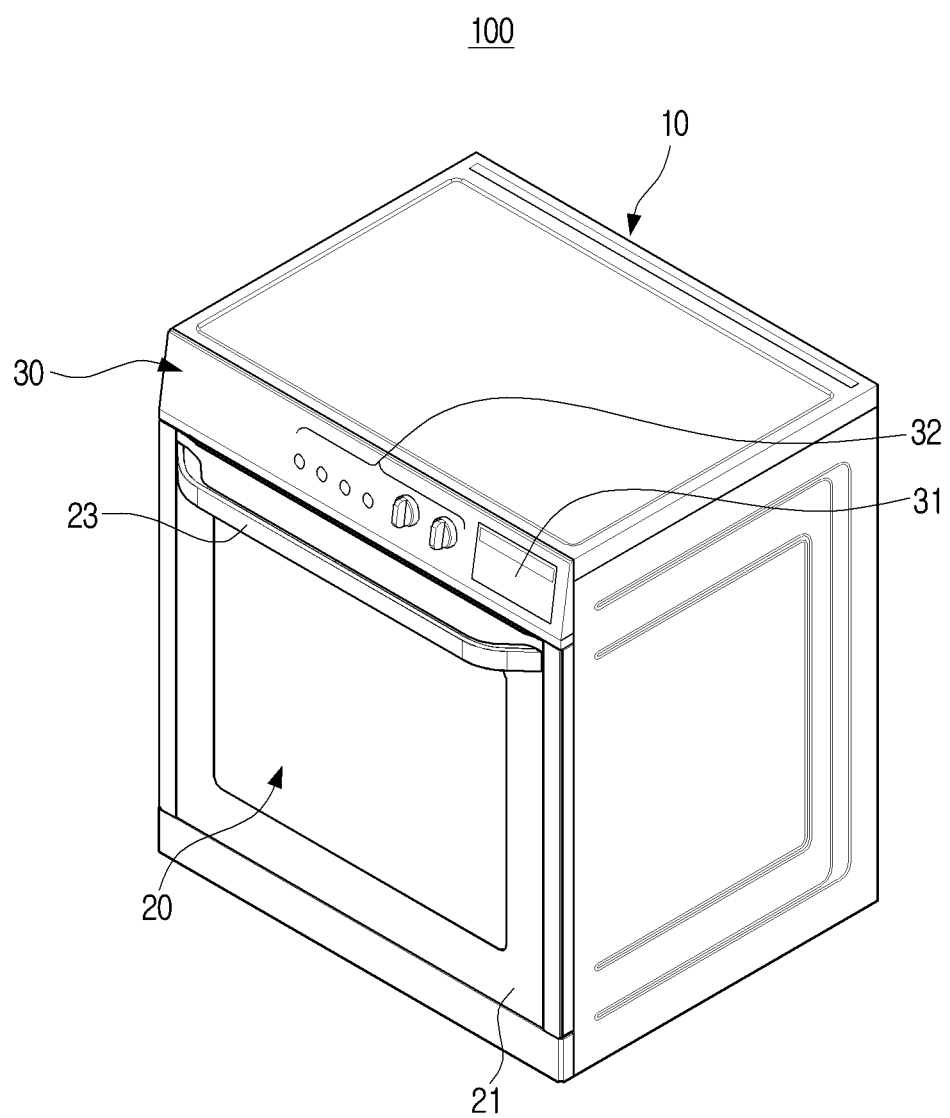
FIG. 1 is a perspective view for illustrating a detailed configuration of an electronic apparatus according to an embodiment of the disclosure.

Hereinafter, embodiments of the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expressions "at least one of A and B" and "at least one of A or B" should be interpreted to mean any one of "A," "B," or "A and B."

Further, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g. a third element).

Also, singular expressions include plural expressions, unless defined obviously differently in the context. Further, in the disclosure, terms such as "include" and "comprising" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and it may be implemented as hardware, software, or a combination of hardware and software. Also, a plurality of "modules" or a plurality of "parts" may be integrated into at least one module and implemented as at least one processor, except "a module" or "a part" that needs to be implemented as specific hardware.

In addition, in this specification, the term "user" may refer to a person who uses an electronic apparatus or an apparatus using an electronic apparatus (e.g.: an artificial intelligence electronic apparatus).

Hereinafter, an example embodiment of the disclosure will be described in more detail with reference to the accompanying drawings.

FIG. 1 is a perspective view for illustrating a detailed configuration of an electronic apparatus 100 according to an example embodiment.

Referring to FIG. 1, the electronic apparatus 100 is merely an example, and according to various example embodiments of the disclosure, a cooking apparatus can obviously be implemented in various forms. For example, the cooking apparatus may be an oven, or a stove, but the disclosure is not limited thereto. However, the disclosure is not limited to a cooking apparatus. As such, according to other example embodiments, one or more aspects of the disclosure for recommending a menu item may be implemented in another electronic device different from a cooking apparatus.

As illustrated in FIG. 1, the electronic apparatus 100 includes a main body 10 forming the exterior.

Also, the electronic apparatus 100 includes a cooking chamber 20 opened toward one side. Here, the cooking chamber 20 may mean a space accommodating an item or an object to be cooked. For example, the object to the cooked may be ingredients or food items. The cooking chamber 20 of the main body 10 may be a cooking chamber 20, in which, an item is cooked, and the cooking chamber 20 may be opened toward the front side of the electronic apparatus 100.

According to an embodiment, the cooking chamber 20 is formed in a box shape, and its front surface is opened for receipt and withdrawal of an item to be cooked. According to an embodiment, the front surface of the main body 10 includes an opening connected with the cooking chamber 20.

In this case, the front surface of the cooking chamber 20 may be opened or closed by a door 21 connected to the main body 10. For this, the door 21 may be hinge-coupled to the lower part of the main body 10 so that it can rotate with respect to the main body 10. Also, in the upper part of the front surface of the door 21, a door handle 23 that a user can grip is provided, and a user can open or close the cooking chamber 20 by gripping the door handle 23.

Also, in the cooking chamber 20, a heater for heating an item to be cooked may be provided. In this case, the heater may be an electronic heater including an electronic resistance element. However, the heater is not limited to an electronic heater, but it may also be a gas heater that generates heat by combusting gas.

In the upper part of the main body 10, a control panel 30 is arranged. The control panel 30 may include a display 31 that receives input of a user command for displaying information on various kinds of operations of the electronic apparatus 100 and controlling the operations of the electronic apparatus 100. Also, the control panel 30 may include a button 32 receiving input of various user commands for controlling the operations of the electronic apparatus 100.

According to an embodiment of the disclosure, the electronic apparatus 100 may cook an item to be cooked in consideration of the size and the cooked state of the item to be cooked introduced into the cooking chamber.

Specifically, the electronic apparatus 100 may determine a cooking time for an item to be cooked according to the kind of the item to be cooked that a user selected through the control panel 30. Here, the electronic apparatus 100 may determine the size of the item to be cooked, and determine the cooking time according to the determined size. For example, even in the case of the same kind of subject to be cooked, the cooking time may be determined to be relatively shorter if the size of the item to be cooked is smaller, and the cooking time may be determined to be relatively longer if the size of the item to be cooked is larger.

Then, the electronic apparatus 100 may determine the cooked state of the item to be cooked while cooking the item to be cooked, and control the cooking process based on the cooked state.

Specifically, if it is determined that cooking for the item to be cooked has been completed according to the ripened degree of the item to be cooked, the electronic apparatus 100 may finish cooking even if it is before the completion of the set cooking time. For example, the electronic apparatus 100 may determine the ripened degree of the item to be cooked, and if it is determined that cooking for the item to be cooked has been completed according to the ripened degree of the item to be cooked, the electronic apparatus 100 may finish cooking even if it is before the cooking time is finished.

As described above, according to the embodiments of the disclosure, a cooking time is not determined only in consideration of the kind of an item to be cooked, but even in the case of the same kind of items to be cooked, different cooking times may be determined according to the size of the item to be cooked. Also, while cooking is performed, the time that cooking is finished may be determined according to the cooked state of the item to be cooked. Accordingly, even in case a user does not know a correct recipe due to a difference in the size of the item to be cooked, etc., if only the user selects the kind of the item to be cooked that he wishes to cook, the user can cook the item to be cooked optimally without monitoring regarding the cooking process.

Figure 2:
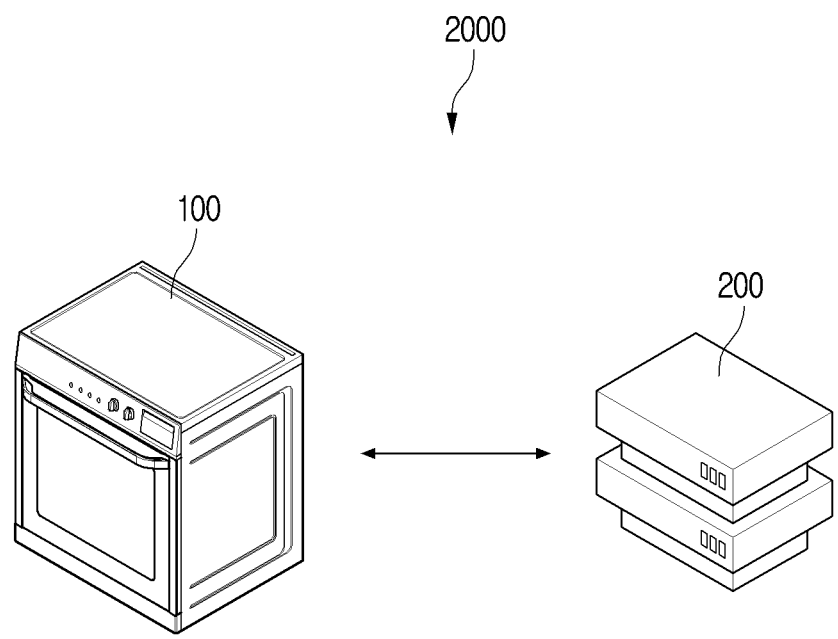
FIG. 2 is a diagram for illustrating communicative connection between an electronic apparatus and a server according to an embodiment of the disclosure.

FIG. 2 is a diagram for illustrating system (2000) performing communicative connection between the electronic apparatus 100 and the server 200.

Referring to FIG. 2, the electronic apparatus 100 may perform communication with the server 200. Specifically, the electronic apparatus 100 may transmit information necessary for identifying a recommended menu item to the server 200. Here, the information necessary for identifying a recommended menu item may include at least one of information related to a user input, information related to the context (or context information) of the electronic apparatus 100, or menu selection history. Here, the user input may include the menu item selected by the user and the order of the selected menu item. Then, the server 200 may identify a recommended menu item based on the information received from the electronic apparatus 100, and transmit the recommended menu item to the electronic apparatus 100. Here, the electronic apparatus 100 may additionally include a communication interface for communication with the server 200.

The communication interface is a component performing communication with various types of external apparatuses according to various types of communication methods. The communication interface may include a wireless communication module or a wired communication module. Here, each communication module may be implemented in a form of at least one hardware chip.

Here, the wireless communication module may be a module that communicates with an external apparatus wirelessly. For example, the wireless communication module may include at least one module among a Wi-Fi module, a Bluetooth module, an infrared communication module, or other communication modules.

Here, the wired communication module may be a module that communicates with an external apparatus via wire. For example, the wired communication module may include at least one of a local area network (LAN) module, an Ethernet module, a pair cable, a coaxial cable, an optical fiber cable, or an ultra-wideband (UWB) module.

A detailed operation of identifying a recommended menu item through the server 200 will be described in FIG. 24.

Figure 3:
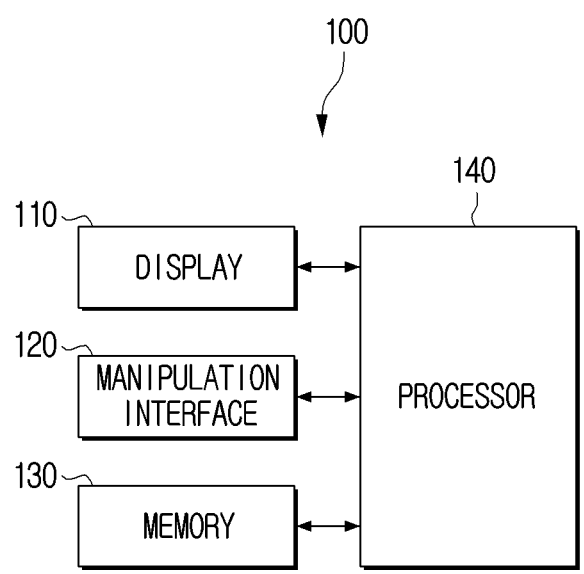
FIG. 3 is a block diagram illustrating an electronic apparatus according to an embodiment of the disclosure.

FIG. 3 is a block diagram illustrating the electronic apparatus 100 according to an embodiment of the disclosure.

Referring to FIG. 3, the electronic apparatus 100 may include a display 110, a manipulation interface 120, a memory 130, and a processor 140.

The electronic apparatus 100 according to the various embodiments of this specification may be an apparatus including the display 110 and the manipulation interface 120.

The electronic apparatus 100 according to the various embodiments of this specification may include, for example, at least one of a smartphone, a tablet PC, a mobile phone, a desktop PC, a laptop PC, a PDA, or a portable multimedia player (PMP). In some embodiments, the electronic apparatus 100 may include, for example, at least one of a television, a digital video disk (DVD) player, or a media box (e.g.: Samsung HomeSync™ Apple TV™, or Google TV™).

The display 110 may be implemented as displays in various forms such as a liquid crystal display (LCD), an organic light emitting diodes (OLED) display, a plasma display panel (PDP), etc. Inside the display 110, driving circuits that may be implemented in forms such as an amorphous silicon thin film transistor (a-Si TFT), a low temperature poly silicon (LTPS) TFT, an organic TFT (OTFT), etc., a backlight unit, etc. may also be included. The display 110 may be implemented as a touch screen combined with a touch sensor, a flexible display, a three-dimensional (3D) display, etc. Also, the display 110 according to an embodiment of the disclosure may include not only a display panel outputting images, but also a bezel housing the display panel. In particular, a bezel according to an embodiment of the disclosure may include a touch sensor for detecting user interactions.

The manipulation interface 120 (or the user input interface) may be implemented as an apparatus such as a button, a touch pad, a mouse, and a keyboard, or implemented as a touch screen that can perform both of the aforementioned display function and a manipulation input function. Here, a button may be various types of buttons such as a mechanical button, a touch pad, a wheel, etc. formed in any areas such as the front surface part, the side surface part, the rear surface part, etc. of the exterior of the main body of the electronic apparatus 100. According to an embodiment, the manipulation interface may be a graphical user interface (GUI).

The memory 130 may be implemented as an internal memory such as a ROM (e.g., an electrically erasable programmable read-only memory (EEPROM)), a RAM, etc. included in the processor 140, or as a memory separate from the processor 140. In this case, the memory 130 may be implemented in a form of a memory embedded in the electronic apparatus 100, or in a form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100.

In the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The processor 140 may perform overall control operations of the electronic apparatus 100. Specifically, the processor 140 performs a function of controlling the overall operations of the electronic apparatus 100.

The processor 140 may be implemented as a digital signal processor (DSP) processing digital signals, a microprocessor, and a time controller (TCON). However, the disclosure is not limited thereto, and the processor 140 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM), or may be defined by the terms. Also, the processor 140 may be implemented as a system on chip (SoC) having a processing algorithm stored therein or large scale integration (LSI), or in the form of a field programmable gate array (FPGA). In addition, the processor 140 may perform various functions by executing computer executable instructions stored in the memory 130.

The electronic apparatus 100 may store menu selection history including a first item of a first category and a second menu of a second category subordinate to the first menu item in the memory 130.

The electronic apparatus 100 may include a processor 140 configured to, if a user input selecting at least one menu item is received through the manipulation interface 120, identify whether provision of guide information is necessary based on the user input, and if it is identified that provision of guide information is necessary, control the display 110 to display the guide information including a recommended menu item based on information on the selected at least one menu item, information on the current context of the electronic apparatus 100, and the menu selection history stored in the memory 130.

Here, the processor 140 may receive a user input through the manipulation interface 120. Specifically, the user input may be a user input selecting at least one menu item. Here, the operation of selecting a menu item may include at least one of an operation of activating a menu item or an operation of moving to an upper menu category or a lower menu category. For example, the processor 140 may select the A category in FIG. 14, and receive a user input selecting menu item #01.

Here, the menu items may be provided at various menu categories at various depths. For example, first menu items may be included in a first menu category of a first depth and second menu items may be included in a second menu category of a second depth. Here, the first menu category may be the upper menu category of the second menu category. Also, the second menu category may be the lower menu category of the first menu category. In the case of selecting the first menu category, the processor 140 may display the second menu category subordinate to the first menu category on the display 110. According to an embodiment, the second menu category may be a branch of an menu item in the first menu category. Explanation regarding the structure of the menus will be described in FIG. 13.

Here, the processor 140 may identify whether provision of guide information is necessary based on a user input acquired through the manipulation interface 120. Whether provision of guide information is necessary may be determined based on whether an event is identified. Specifically, if an event is identified based on a user input, the processor 140 may identify that provision of guide information is necessary.

According to an embodiment, the event may be a predetermined event. Here, the event may include at least one of an event that an additional user input selecting a menu item is not received during a threshold time after a menu item of a specific category was selected, an event that a speed in which a menu item is changed according to a user input is greater than or equal to a threshold speed, or an event that a user input cancelling the menu item selection is received after a menu item of a specific category was selected.

An event that an additional user input selecting a menu item is not received during a threshold time after a menu item of a specific depth was selected may mean an event that a user's selection is not detected. In a situation wherein a user stops without selecting a specific menu item, an additional user input may not be received. Accordingly, if an event that an additional user input is not received during a threshold time is identified, the processor 140 may identify that provision of guide information is necessary.

An event that a speed that a menu item is changed according to a user input is greater than or equal to a threshold speed may mean an event that the menu item displayed on the display 110 is changed quickly.

According to an embodiment, changed menu items may have different depths. That is, the changed menu items may be from different categories. The processor 140 may receive a user input changing (or moving) a plurality of menus items having different depths through the manipulation interface 120. Then, the processor 140 may acquire the speed that the plurality of menu items are changed (or moved). Then, if the acquired speed is greater than or equal to the threshold speed, the processor 140 may identify that provision of guide information is necessary.

According to another embodiment, changed menu items may have the same depth. The processor 140 may receive a user input moving a plurality of menu items having the same depth through the manipulation interface 120. Then, the processor 140 may acquire the speed that the plurality of menu items are changed (or moved). Then, if the acquired speed is greater than or equal to the threshold speed, the processor 140 may identify that provision of guide information is necessary.

An event that a user input cancelling the menu item selection is received after a menu item of a specific depth was selected may mean an event that a user withdraws his selection. If a user input cancelling the menu item selection is received, the processor 140 may identify that provision of guide information is necessary.

Figure 4:
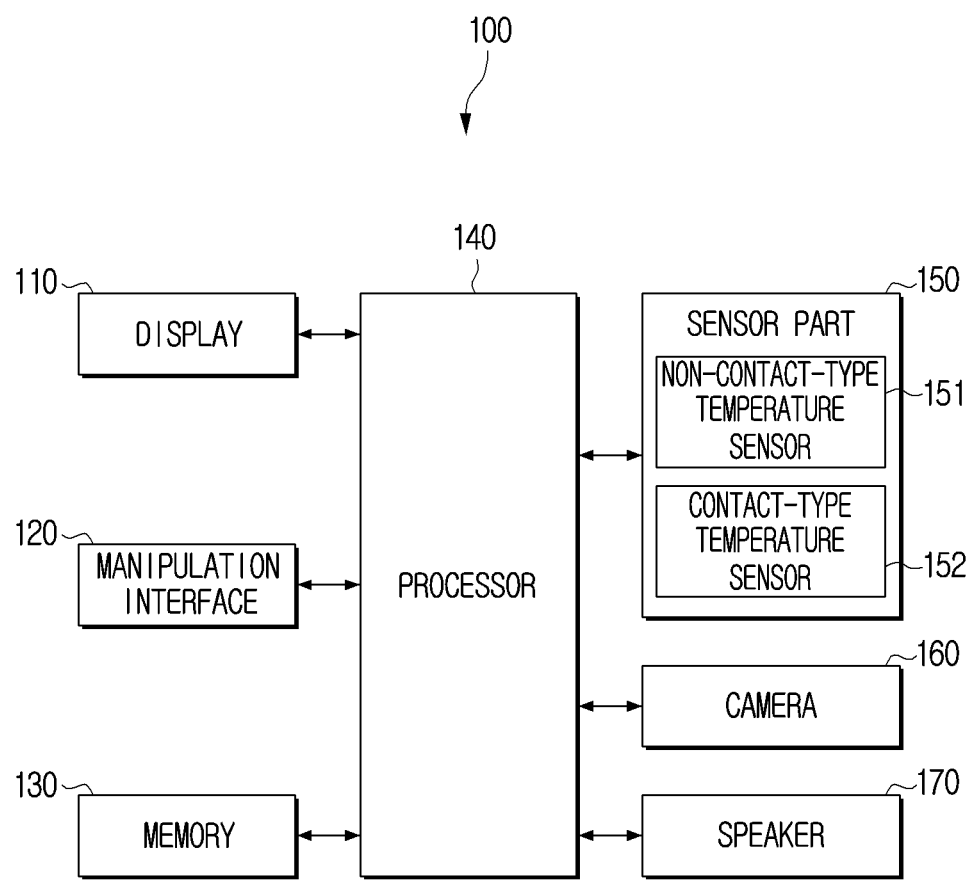
FIG. 4 is a block diagram for illustrating a detailed configuration of the electronic apparatus in FIG. 3.

If a predetermined event is identified, the processor 140 may acquire context information. Here, the context information may mean various information acquired at the electronic apparatus 100. Here, the context information may include sensing data acquired through a sensor part 150 (as shown in FIG. 4), image data acquired through the camera 160 (as shown in FIG. 4), or information on the current state of the electronic apparatus 100. Here, the state information of the electronic apparatus 100 may be information indicating which function the electronic apparatus 100 is performing.

When the context information is acquired, the processor 140 may identify a recommended menu item based on the user input, the context information, and the menu selection history stored in the memory 130. Then, the processor 140 may generate guide information including the identified recommended menu item. Here, the guide information may include at least one of guide image data or guide audio data. Then, the processor 140 may provide the guide information including the recommended menu item to the user. Here, the operation of providing the guide information to the user may include at least one of an operation of displaying guide image data through the display 110 or an operation of outputting guide audio data through the speaker 170.

If at least one event is identified among an event that an additional user input selecting a menu item is not received during a threshold time after a menu item of a specific depth was selected, an event that a speed that a menu item is changed according to a user input is greater than or equal to a threshold speed, and an event that a user input cancelling the menu item selection is received after a menu item of a specific depth was selected, the processor 140 may identify that provision of guide information is necessary.

Here, explanation regarding an event that an additional user input selecting a menu item is not received during a threshold time after a menu item of a specific depth was selected will be described in FIG. 6.

Here, an event that a speed that a menu item is changed according to a user input is greater than or equal to a threshold speed will be described in FIGS. 7, 8 and 9.

Here, an event that a user input cancelling the menu item selection is received after a menu item of a specific depth was selected will be described in FIG. 10.

The information on the current context of the electronic apparatus 100 may include at least one of temperature information inside the electronic apparatus 100, temperature information of an item to be cooked, information on whether a specific function is executed, image information inside the electronic apparatus 100, or date and time information.

Here, the temperature information inside the electronic apparatus 100 may mean the temperature information of the cooking chamber. Here, the temperature information of an item to be cooked may mean the temperature information of food to be cooked. Here, the information on whether a specific function is executed may mean information indicating whether it is a state that a specific function is currently being executed at the electronic apparatus 100 (an on state) or a state that a specific function is not being executed (an off state). Here, the image information inside the electronic apparatus 100 may mean an image that photographed the cooking chamber. Here, the date and time information may include at least one of time information or date information.

The information related to the temperature among the context information may be acquired through the sensor part 150. Here, the operation of acquiring the context information through the sensor part 150 will be described in the embodiment 1110 in FIG. 11.

The information related to an image among the context information may be acquired through the camera 160. Here, the operation of acquiring the context information through the camera 160 will be described in the embodiment 1120 in FIG. 11.

The processor 140 may determine candidate menu items, and determine a recommended menu item among the determined candidate menu items.

Specifically, the processor 140 may identify candidate menu items related to the selected at least one menu item among the information included in the menu selection history, and identify a recommended menu item based on the candidate menu items and the current context information of the electronic apparatus 100.

Here, the information included in the menu selection history may include information on menu items that the user selected during a predetermined period. Here, the selected at least one menu item may mean the menu item that the user currently selected. Here, the candidate menu items may mean menu items subordinate to the menu item that the user currently selected. Then, the processor 140 may identify a recommended menu item among the candidate menu items based on the acquired context information.

Figure 13:
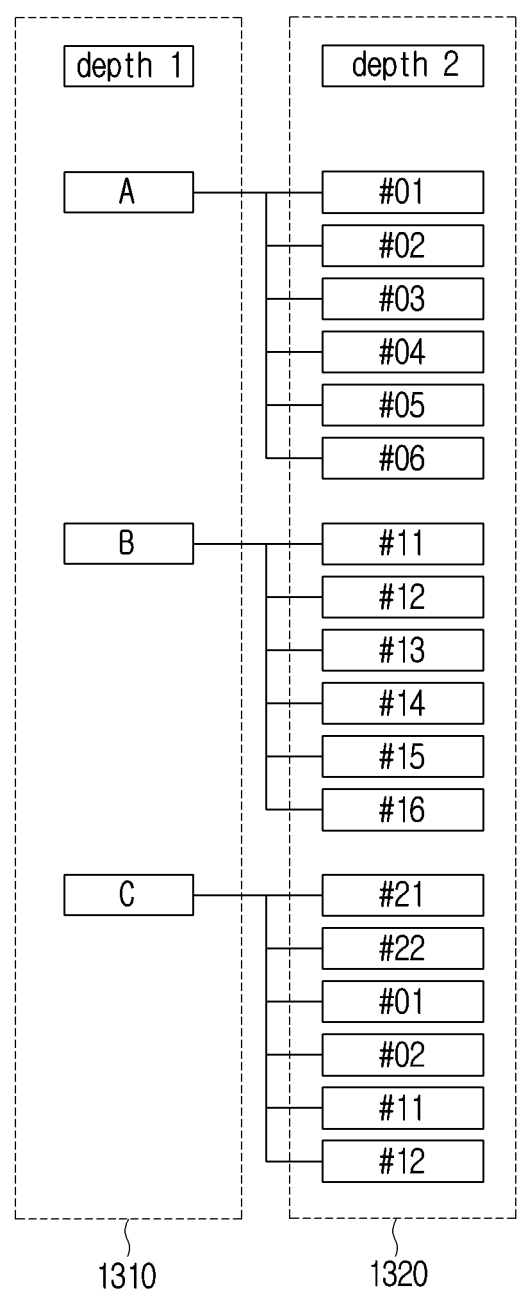
FIG. 13 is a diagram for illustrating menus of different depths.

For example, it is assumed that the user selected the A menu item in FIG. 13. Also, it is assumed that menu items #01, #03, and #05 were selected in the A menu, and menu items #11, #13, and #15 were selected in the B menu, and menu items #21, #01, and #11 were selected in the C menu in the menu selection history. Here, the information included in the menu selection history may be menu items #01, #03, #05, #11, #13, #15, and #21. Here, the selected at least one menu item may be the A menu. Here, the candidate menu items may be menu items #01, #03, and #05 that are menu items subordinate to the A menu. Here, the processor 140 may identify at least one menu item among menu items #01, #03, and #05 as a recommended menu item based on the context information.

The processor 140 may identify a recommended menu item based on weights corresponding to the plurality of respective menu items.

The electronic apparatus 100 may store the plurality of menu items in the memory 130. Also, the processor 140 may acquire weights corresponding to the plurality of respective menu items stored in the memory 130 based on the information on the at least one menu item, the context information, and the menu selection history, and identify a recommended menu item based on the weights corresponding to the plurality of respective menu items.

Here, the plurality of menu items may mean at least one menu item that can be provided as a recommended menu item. If a predetermined event is identified, the processor 140 may acquire the plurality of menu items stored in the memory 130, and acquire the weights corresponding to the plurality of respective menu items. Then, the processor 140 may identify a recommended menu item among the plurality of menu items based on the weights. Here, the processor 140 may acquire the weights for the menu items based on a user input (the information on the at least one menu item), the context information, and the menu selection history.

Specifically, the processor 140 may acquire a first sub weight for a specific menu item based on a user input, acquire a second sub weight for a specific menu item based on the context information, and acquire a third sub weight for a specific menu item based on the menu selection history. Then, the processor 140 may sum up the first sub weight, the second sub weight, and the third sub weight, and acquire a weight (or a summed-up weight) for a specific menu item.

Then, the processor 140 may identify a recommended menu item based on the weights for the plurality of respective menu items. For example, the processor 140 may identify the menu item having the highest weight among the weights for the plurality of respective menu items as the recommended menu item.

The processor 140 may identify the selected menu item based on the information on the at least one menu item, allot the first sub weight to the same menu item as the selected menu item among the plurality of menu items, allot the second sub weight to a similar menu item to the selected menu item among the plurality of menu items, and sum up the first sub weight and the second sub weight and acquire the weights corresponding to the plurality of respective menu items.

Here, the processor 140 may identify the menu item currently selected by the user based on a user input (the information on the at least one menu item). Here, the processor 140 may allot the sub weights to the plurality of respective menu items based on the selected menu item. Specifically, the processor 140 may allot the first sub weight to the same menu item as the selected menu item. Also, the processor 140 may allot the second sub weight to a similar menu item to the selected menu item. In addition, the processor 140 may not allot the sub weights to menu items that are not the same as or similar to the selected menu item. Here, the same menu item may mean a menu item belonging to the category in the table 2610 in FIG. 26. Here, a similar menu item may mean a menu item belonging to the associated category in the table 2610 in FIG. 26. Here, a similar menu item to a specific menu item may be stored in the memory 130.

Then, the processor 140 may sum up the first sub weight and the second sub weight, and acquire the weights corresponding to the plurality of respective menu items.

Figure 27:
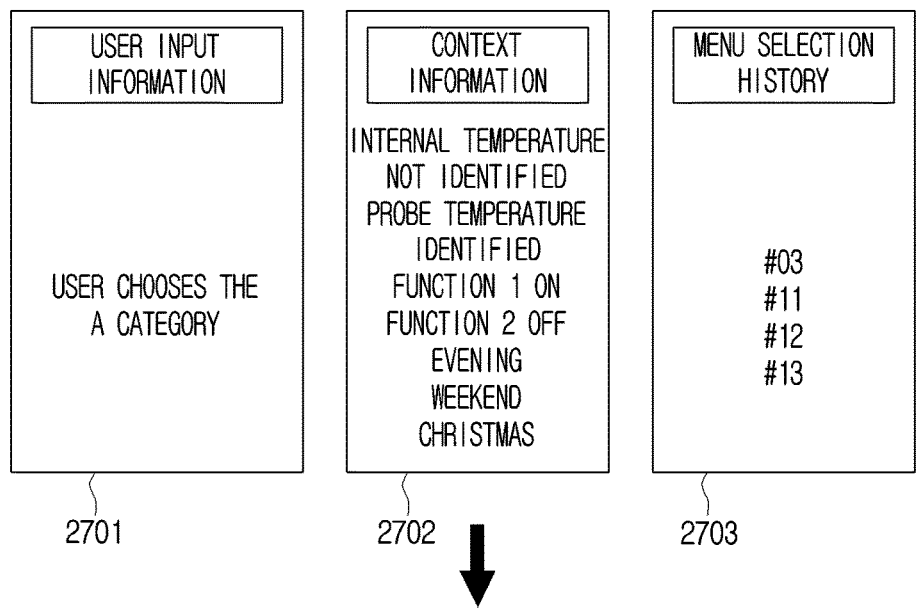
FIG. 27 is a diagram for illustrating an operation of identifying a recommended menu item based on weight information.

For example, referring to the table 2710 in FIG. 27, it is assumed that a predetermined event was identified after the user selected the A menu item. Here, the selected menu item may be the A menu. The processor 140 may allot the first sub weight 60 to menu items #01, #02, #03, etc. falling under the same menu items as the selected A menu among the plurality of menu items ((#01, #02, #03, #11, #12, #13, . . . , #21, #22, #23). Also, the processor 140 may allot the second sub weight 30 to menu items #11, #21, etc. falling under similar menu items (the associated category) to the selected A menu among the plurality of menu items. In addition, the processor 140 may not allot the sub weights to menu items that are not the same as or similar to the selected A menu.

The processor 140 may allot a third sub weight to a menu item corresponding to the context information among the plurality of menu items, allot a fourth sub weight to a menu item corresponding to the menu selection history among the plurality of menu items, and sum up the first sub weight, the second sub weight, the third sub weight, and the fourth sub weight, and acquire the weights corresponding to the plurality of respective menu items.

Here, the processor 140 may allot the third sub weight to the plurality of respective menu items based on the context information. Here, the processor 140 may acquire the context information, and allot the third sub weight to menu items corresponding to the acquired context information.

For example, referring to the table 2710 in FIG. 27, it is assumed that a predetermined event is identified, and the context information includes the evening. The processor 140 may allot the third sub weight to menu items #03, #13, #23, etc. which are menu items corresponding to the evening among the plurality of menu items.

Here, the processor 140 may allot the fourth sub weight to the plurality of respective menu items based on the menu selection history. Here, the processor 140 may acquire the menu selection history, and allot the fourth sub weight to menu items included in the menu selection history.

For example, referring to the table 2710 in FIG. 27, it is assumed that a predetermined event is identified, and menu items #03, #11, #12, and #13 are included in the menu selection history. The processor 140 may allot the fourth sub weight 40 to menu items #03, #11, #12, and #13 which are menu items included in the menu selection history among the plurality of menus.

A detailed operation related to weights will be described in FIG. 26 and FIG. 27.

If it is identified that provision of guide information is necessary, the processor 140 may identify a recommended menu item based on the information on the selected at least one menu item, the information on the current context of the electronic apparatus 100, and the menu selection history stored in the memory 130, and control the display 110 to display an icon for identifying the recommended menu item based on the location wherein the recommended menu item is displayed.

The operation of displaying an icon will be described in FIG. 17.

If it is identified that provision of guide information is necessary, the processor 140 may input the information on the selected at least one menu item and the current context information of the electronic apparatus 100 into a trained neural network model, and acquire a recommended menu item, and the neural network model may be trained based on the current context information of the electronic apparatus 100 and the menu selection history.

The neural network model may be described as an artificial intelligence model. A detailed operation in this regard will be described in FIG. 12.

The electronic apparatus 100 may be a cooking apparatus including a heater that heats an item to be cooked, and if a user input selecting a menu item included in the guide information is received, the processor 140 may perform a function corresponding to the selected menu item, and the function corresponding to the selected menu item may include at least one of a function of displaying a text including a cooking process of the selected menu item, a function of displaying an image including the cooking process of the selected menu item, or a function of setting a schedule of the heater to perform the cooking process of the selected menu item. As such, the cooking apparatus may cook the item based on the selected menu item. However, the disclosure is not limited thereto, and as such, according to another embodiment the electronic apparatus may perform another operation based on the selection menu item.

Here, the electronic apparatus 100 may be implemented as a cooking apparatus. Here, the cooking apparatus may mean an apparatus cooking an item to be cooked, and may include a heater heating an item to be cooked. Here, the processor 140 may provide guide information including a recommended menu item, and the recommended menu item may be a menu item related to an item to be cooked. It is assumed that a user selected one menu item among recommended menu items. Here, the processor 140 may perform a function corresponding to the menu item selected by the user (referred to as the selected menu item hereinafter). For example, if a pizza menu item is selected by the user, the processor 140 may perform a function corresponding to the pizza menu item. Specifically, the processor 140 may perform at least one of a function of displaying a text related to the pizza cooking process, a function of displaying an image related to the cooking process of the pizza menu item, or a function of setting the schedule of the heater for performing the cooking process of the pizza menu item. Here, the schedule of the heater may mean a work schedule indicating for how much time and with how much strength the heater provides heat energy.

The electronic apparatus 100 may include a contact-type temperature sensor 152 (see FIG. 4) for sensing the temperature of the item to be cooked, and if it is identified that provision of guide information is necessary, the processor 140 may acquire the temperature of the item to be cooked as the current context information of the electronic apparatus 100 through the contact-type temperature sensor 152, and identify a recommended menu item based on the information on the selected at least one menu item, the current context information of the electronic apparatus 100 including the temperature of the item to be cooked, and the menu selection history stored in the memory 130.

The operation of acquiring the context information by using the contact-type temperature sensor will be described in detail in the embodiment 1110 in FIG. 11 and FIG. 23.

The electronic apparatus 100 may analyze a user input selecting a menu item, and determine whether to provide a recommended menu item to the current user. In case the user cannot find a menu item that he wants, if the electronic apparatus 100 automatically provides a recommended menu item, convenience can be improved. The electronic apparatus 100 may determine whether to provide a recommended menu item to the user based on a predetermined event. Here, the predetermined event may be changed according to the user's setting. In case a recommended menu item is provided based on the predetermined event, an operation of determining a recommended menu item may be important. This is because the user's satisfaction will be high only if a menu item appropriate for the user is recommended. The electronic apparatus 100 may identify a recommended menu item in consideration of a user input (the menu item currently selected by the user), the context information, and the menu selection history. As the electronic apparatus 100 additionally considers the context information and the menu selection history other than the currently selected menu item, precision of determining a recommended menu item can become higher. Also, according to various methods of providing a recommended menu item, the user may not be interfered in the previous menu item selection.

In the above, only some components constituting the electronic apparatus 100 were illustrated and described, but in actual implementation, various components may additionally be included. Explanation in this regard will be described below with reference to FIG. 4.

FIG. 4 is a block diagram for illustrating a detailed configuration of the electronic apparatus 100 in FIG. 3.

Referring to FIG. 4, the electronic apparatus 100 may include at least one of the display 110, the manipulation interface 120, the memory 130, the processor 140, the sensor part 150, the camera 160, or the speaker 170.

Among the operations of the display 110, the manipulation interface 120, the memory 130, and the processor 140, regarding the same operations as those described above, overlapping explanation will be omitted.

The sensor part 150 may sense various information through at least one sensor. Here, the sensor part 150 may include at least one of a non-contact-type temperature sensor 151 or a contact-type temperature sensor 152. The non-contact-type temperature sensor 151 may sense the temperature inside the cooking chamber. Also, the contact-type temperature sensor 152 may sense the surface temperature of the item to be cooked or the temperature inside the item to be cooked. Here, the contact-type temperature sensor 152 may be implemented as a temperature probe. Also, the sensor part 150 may include a humidity sensor.

The camera 160 is a component for photographing an object and generating a photographed image, and here, the photographed image is a concept including both of a moving image and a still image. The camera 160 may acquire an image for at least one external apparatus, and may be implemented as a camera, a lens, an infrared sensor, etc.

The camera 160 may include a lens and an image sensor. As types of the lens, there are a general wide use lens, a wide angle lens, a zoom lens, etc., and the type may be determined according to the type, the characteristics, the use environment, etc. of the electronic apparatus 100. As the image sensor, a complementary metal oxide semiconductor (CMOS) and a charge coupled device (CCD), etc. may be used.

The speaker 170 may be a component that outputs not only various kinds of audio data, but also various kinds of notification sounds or voice messages, etc.

Figure 5:
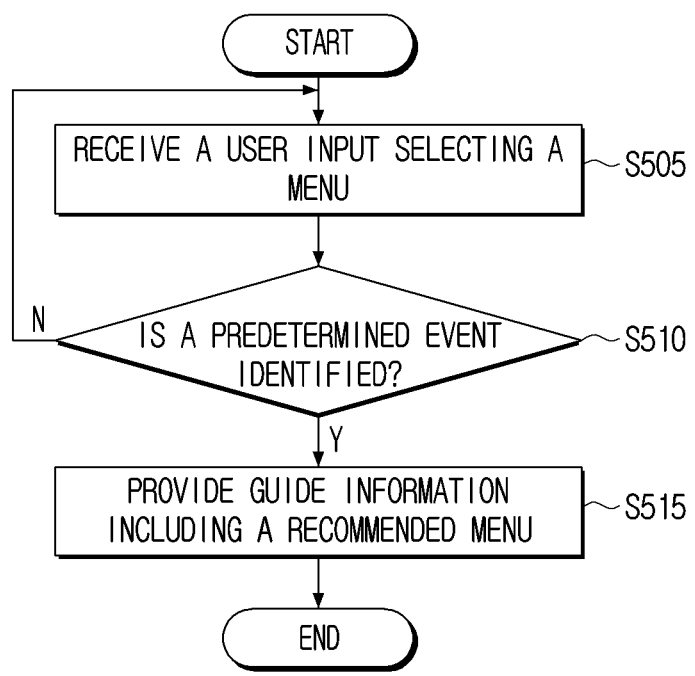
FIG. 5 is a flow chart for illustrating an operation of providing guide information based on a user input.

FIG. 5 is a flow chart for illustrating an operation of providing guide information based on a user input.

Referring to FIG. 5, the electronic apparatus 100 may receive a user input selecting a menu item in operation S505. Then, the electronic apparatus 100 may identify a predetermined event based on the user input in operation S510. Specifically, the electronic apparatus 100 may identify whether a predetermined event occurred based on the user input. Here, the user input may mean the order of the menu items selected by the user. Here, the predetermined event may mean an event that it is determined that provision of guide information is necessary. Explanation related to the predetermined event will be described in FIG. 6 to FIG. 9.

If a predetermined event is not identified in operation S510-N, the electronic apparatus 100 may repeatedly receive a user input, and identify whether a predetermined event occurred.

If a predetermined event is identified in operation S510-Y, the electronic apparatus 100 may provide guide information including a recommended menu item in operation S515. Specifically, the electronic apparatus 100 may identify a recommended menu item corresponding to the user input, and generate guide information including the identified recommended menu item. Then, the electronic apparatus 100 may provide the guide information including the recommended menu item. Here, the operation of providing the guide information may include an operation that a guide image is displayed through the display 110 of the electronic apparatus 100, or an operation that a guide audio is output through the speaker 170 of the electronic apparatus 100.

Figure 6:
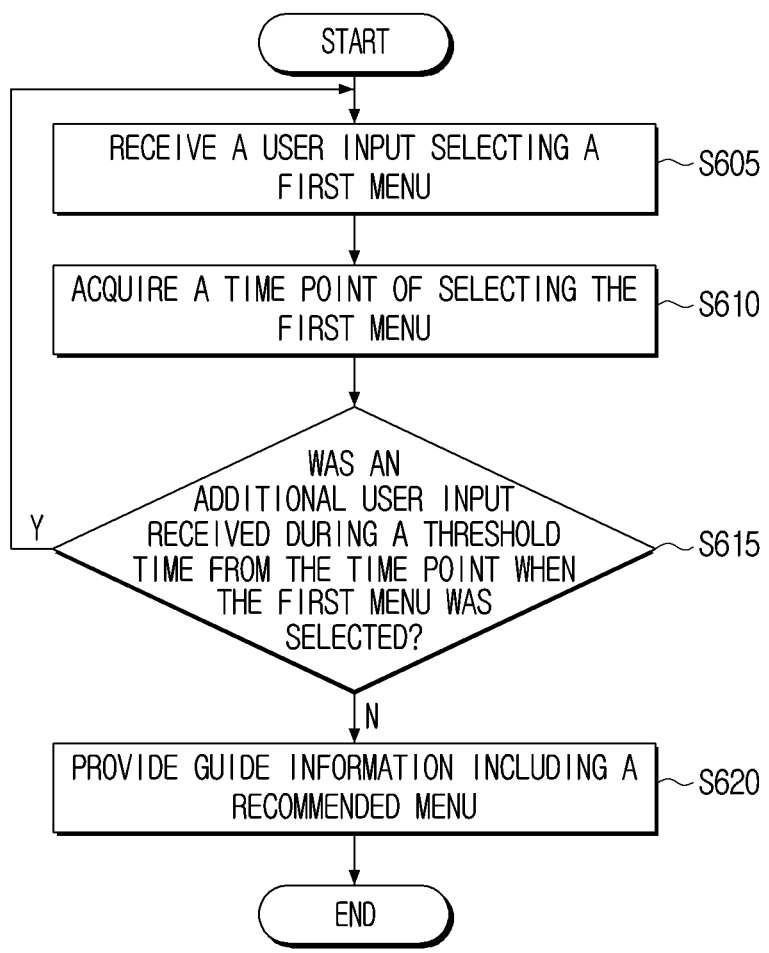
FIG. 6 is a flow chart for illustrating a predetermined event according to an embodiment of the disclosure.

FIG. 6 is a flow chart for illustrating a predetermined event according to an embodiment of the disclosure.

Referring to FIG. 6, a predetermined event may mean an event that an additional user input is not received during a threshold time.

Here, the electronic apparatus 100 may receive a user input selecting a first menu item in operation S605. Then, the electronic apparatus 100 may acquire the time when the user selects the first menu item in operation S610. Then, the electronic apparatus 100 may identify whether an additional user input was received during the threshold time from the time when the user selected the first menu item in operation S615.

If an additional user input is received within the threshold time from the time when the user selected the first menu item, the electronic apparatus 100 may repeatedly perform the operations S605, S610 and S615.

If an additional user input is not received within the threshold time from the time when the user selected the first menu item, the electronic apparatus 100 may provide guide information including a recommended menu item in operation S620. As the operation of providing the guide information may correspond to S515 in FIG. 5, overlapping explanation will be omitted.

Figure 7:
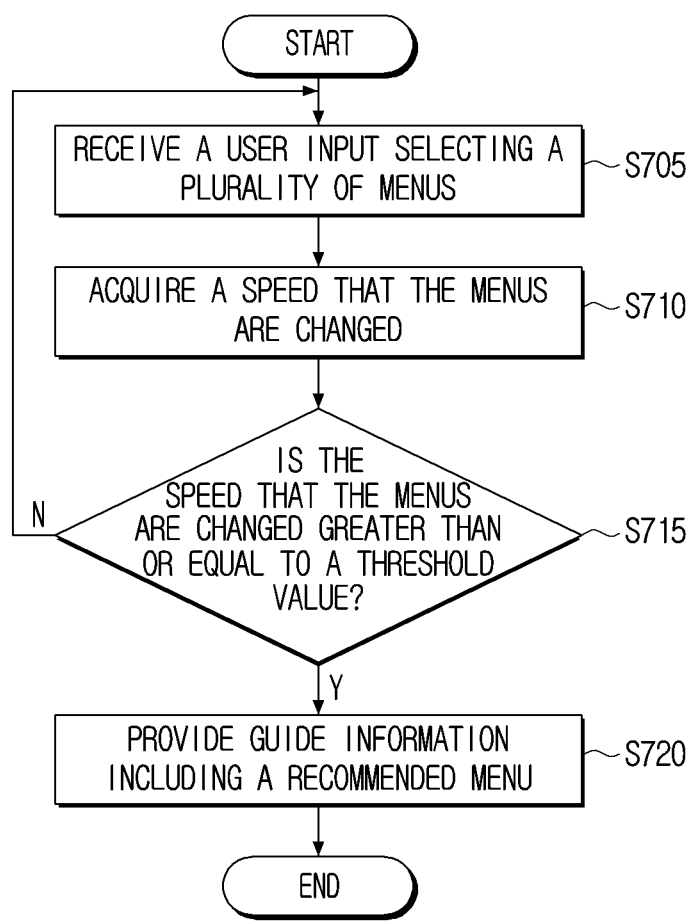
FIG. 7 is a flow chart for illustrating a predetermined event according to another embodiment of the disclosure.

FIG. 7 is a flow chart for illustrating a predetermined event according to another embodiment of the disclosure.

Referring to FIG. 7, a predetermined event may mean an event that a speed that a menu item is changed is greater than or equal to a threshold speed.

Here, the electronic apparatus 100 may receive a user input selecting a plurality of menu items in operation S705. Depending on implementation examples, all of the plurality of menu items may be menu items having the same depth. Then, the electronic apparatus 100 may acquire the speed that the menu items are changed in operation S710. Specifically, the electronic apparatus 100 may acquire the speed that the plurality of menu items selected by the user are changed. Here, the speed that the menu items are changed may be calculated based on a difference between the time when the user selected the first menu item and the time when the user selected the second menu item. Here, the speed of change may mean an inverse number of the difference between the time when the user selected the first menu item and the time when the user selected the second menu item.

The feature that the speed of change is large may mean that the difference between the time when the user selected the first menu item and the time when the user selected the second menu item is small. In case the user selects the plurality of menu items quickly, the speed that the menu items are changed may be large.

The feature that the speed of change is small may mean that the difference between the time when the user selected the first menu item and the time when the user selected the second menu item is large. In case the user selects the plurality of menu items slowly, the speed that the menu items are changed may be small. A detailed calculation process related to the speed of change will be described in FIG. 8.

If the speed that the menu items are changed is smaller than a threshold value in operation S715-N, the electronic apparatus 100 may repeat the operations S705, S710, and S715.

If the speed that the menu items are changed is greater than or equal to the threshold value in operation S715-Y, the electronic apparatus 100 may provide guide information including a recommended menu item in operation S720. As the operation of providing the guide information may correspond to S515 in FIG. 5, overlapping explanation will be omitted.

In FIG. 7, the speed that the menu items are changed may be described while being replaced by a difference between times of user inputs, a difference between average times of user inputs, the change speed of the menu items, or the average change speed of the menu items, etc. Also, the speed that the menu items are changed may be described while being replaced by the speed that a user input is received, etc.

FIG. 8 is a table for illustrating a process of calculating a change speed of a menu item.

Referring to the table 810 in FIG. 8, a change speed of a menu item can be calculated based on the time that a user input is received. Also, the first user input to the fifth user input may mean a user's input selecting a menu item. Here, it is assumed that the first user input is received at 14:00:01 (time:minute:second), the second user input is received at 14:00:05, the third user input is received at 14:00:15, the fourth user input is received at 14:00:16, and the fifth user input is received at 14:00:17.

Here, the electronic apparatus 100 may calculate a difference (4 seconds) between the receipt times of the first user input and the second user input from the time when the second user input was input. Also, the electronic apparatus 100 may calculate an average time difference (4 seconds). In addition, the electronic apparatus 100 may calculate a change speed (0.25) of the first menu item selected by the first user input and the second menu item selected by the second user input. Here, the change speed (0.25) may be an inverse number of the time difference (4 seconds). Also, the electronic apparatus 100 may calculate the average change speed (0.25).

Here, the electronic apparatus 100 may calculate a difference (10 seconds) between the receipt times of the second user input and the third user input from the time when the third user input was input. Also, the electronic apparatus 100 may calculate an average time difference (7 seconds). In addition, the electronic apparatus 100 may calculate a change speed (0.1) of the second menu item selected by the second user input and the third menu item selected by the third user input. Here, the change speed (0.1) may be an inverse number of the time difference (10 seconds). Also, the electronic apparatus 100 may calculate the average change speed (0.18).

Here, the electronic apparatus 100 may calculate a difference (1 second) between the receipt times of the third user input and the fourth user input from the time when the fourth user input was input. Also, the electronic apparatus 100 may calculate an average time difference (5 seconds). In addition, the electronic apparatus 100 may calculate a change speed (1) of the third menu item selected by the third user input and the fourth menu item selected by the fourth user input. Here, the change speed (1) may be an inverse number of the time difference (1 second). Also, the electronic apparatus 100 may calculate the average change speed (0.45).

Here, the electronic apparatus 100 may calculate a difference (1 second) between the receipt times of the fourth user input and the fifth user input from the time when the fifth user input was input. Also, the electronic apparatus 100 may calculate an average time difference (4 seconds). In addition, the electronic apparatus 100 may calculate a change speed (1) of the fourth menu item selected by the fourth user input and the fifth menu item selected by the fifth user input. Here, the change speed (1) may be an inverse number of the time difference (1 second). Also, the electronic apparatus 100 may calculate the average change speed (0.59).

The electronic apparatus 100 may identify generation of a predetermined event based on at least one of the time difference, the average time difference, the change speed, or the average change speed. In the case of determining a predetermined event based on a user input right before, the electronic apparatus 100 may identify generation of a predetermined event based on at least one of the time difference or the change speed. According to another implementation example, in the case of determining a predetermined event in consideration of all of average user inputs input during a threshold time, the electronic apparatus 100 may identify generation of a predetermined event based on at least one of the average time difference or the average change speed.

Figure 9:
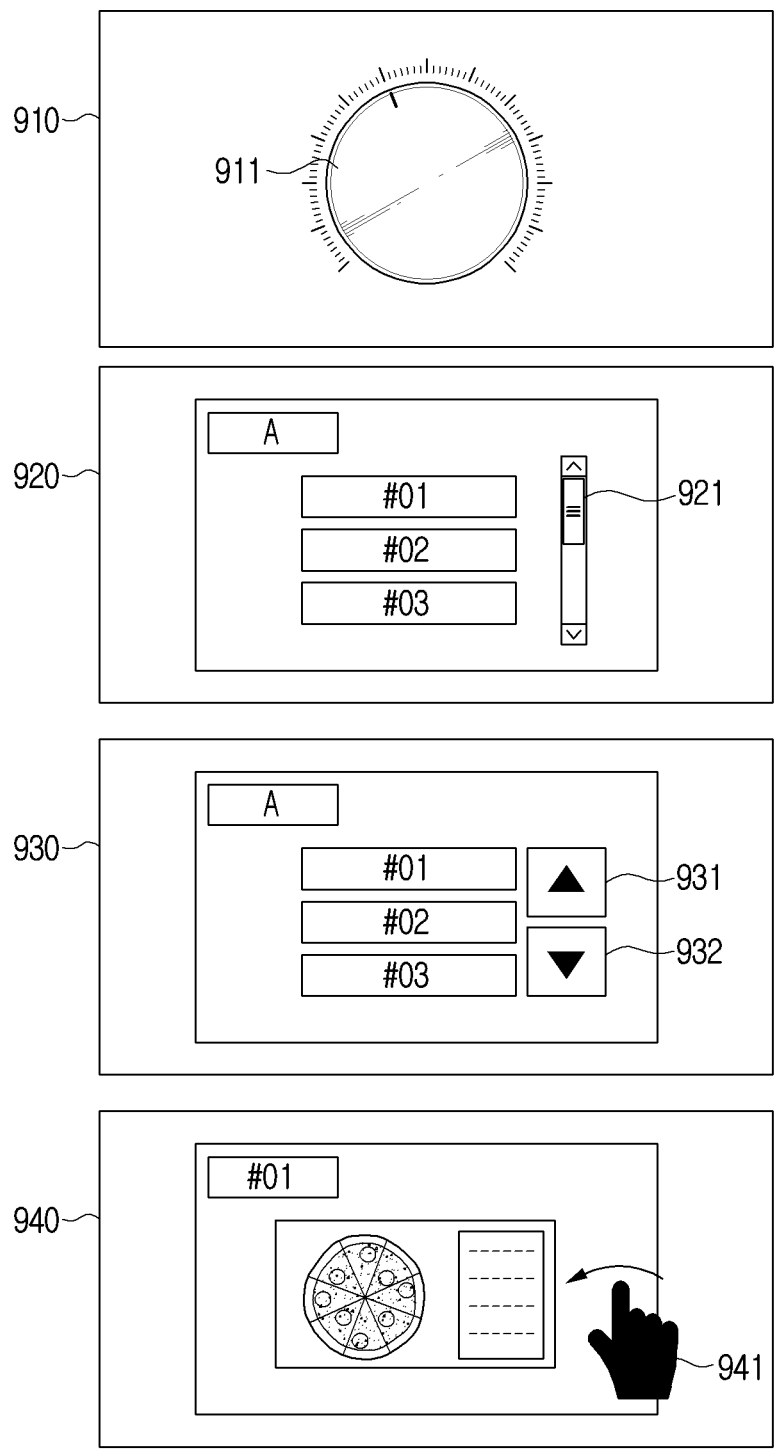
FIG. 9 is a diagram for illustrating a change speed of a menu according to various embodiments of the disclosure.

FIG. 9 is a diagram for illustrating a change speed of a menu item according to various embodiments of the disclosure.

Referring to FIG. 9, the electronic apparatus 100 may select a menu item according to various embodiments.

Referring to the embodiment 910, the manipulation interface 120 of the electronic apparatus 100 may include a dial 911. Here, the dial 911 may be a rotation type manipulation interface. The electronic apparatus 100 may select a menu item according to a user input rotating the dial 911. For example, if a user input rotating the dial 911 is received, the electronic apparatus 100 may change a menu item that can be currently selected. Here, the electronic apparatus 100 may acquire the speed that the dial 911 is rotated. Then, the electronic apparatus 100 may identify the change speed of the menu item based on the rotation speed of the dial 911. Here, the dial 911 may also be described as a knob.

Referring to the embodiment 920, the electronic apparatus 100 may display a scroll UI 921 on the display 110. Here, the scroll UI 921 may be a UI used for changing the displayed menu item. The electronic apparatus 100 may change a menu item that can be selected based on a user input received through the scroll UI 921. For example, if a user drags the scroll UI 921 down, or touches the lower part of the scroll UI 921, the electronic apparatus 100 may display a screen including menu items #04, #05, and #06, but not a screen including menu items #01, #02, and #03. Here, the electronic apparatus 100 may identify the speed that the menu item is changed through the scroll UI 921.

Referring to the embodiment 930, the electronic apparatus 100 may display menu item moving UIs 931, 932 on the display 110. Here, the menu item moving UI 931 may be a UI for changing a menu item that can be selected in a first direction (e.g., upper direction). Here, the menu item moving UI 932 may be a UI for changing a menu item that can be selected in a second direction (e.g., lower direction). For example, if a user input touching the menu item moving UI 932 once is received, the electronic apparatus 100 may display a screen including menu items #02, #03, and #04, but not a screen including menu items #01, #02, and #03. Here, the electronic apparatus 100 may identify the speed that the menu item is changed through the menu item moving UIs 931, 932.

Referring to the embodiment 940, the electronic apparatus 100 may display different menu items based on a swipe input 941. The swipe input 941 may be input in upper, lower, left, and right directions. Here, if a swipe input in the upper direction is received, the electronic apparatus 100 may display an upper menu category. Here, if a swipe input in the lower direction is received, the electronic apparatus 100 may display a lower menu category. Here, if a swipe input in the right direction is received, the electronic apparatus 100 may display the next menu item of the currently displayed menu item. Here, if a swipe input in the left direction is received, the electronic apparatus 100 may display the previous menu item of the currently displayed menu item. Here, the electronic apparatus 100 may acquire the speed that the menu item is changed based on the speed of the swipe input 941. For example, if a swipe input is received in a short time, the electronic apparatus 100 may determine that the speed that the menu item is changed is fast. In contrast, if a swipe input is received in a long time, the electronic apparatus 100 may determine that the speed that the menu item is changed is slow.

Figure 10:
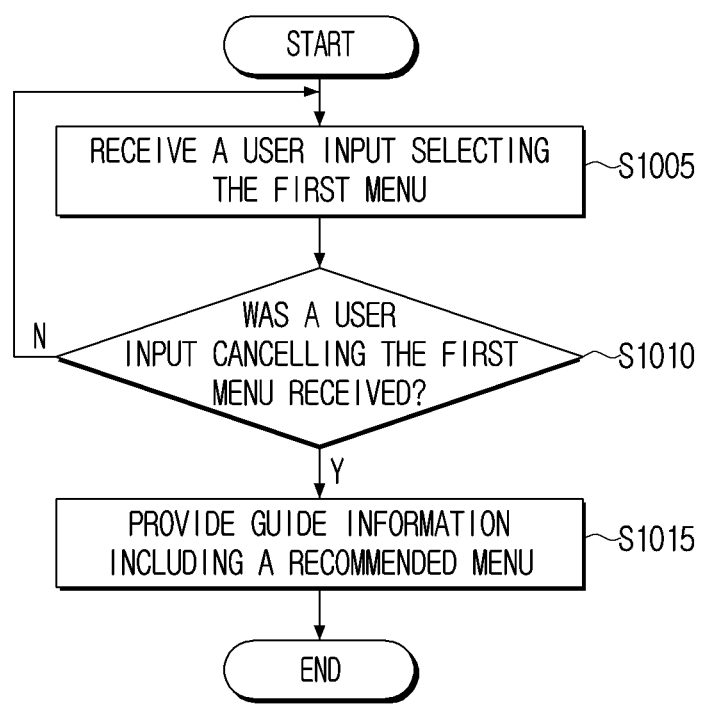
FIG. 10 is a flow chart for illustrating a predetermined event according to still another embodiment of the disclosure.

FIG. 10 is a flow chart for illustrating a predetermined event according to still another embodiment of the disclosure.

Referring to FIG. 10, a predetermined event may mean an event that a user input cancelling the selected menu item is received.

The electronic apparatus 100 may receive a user input selecting the first menu item in operation S1005. Then, the electronic apparatus 100 may identify whether a user input cancelling the first menu item is received in operation S1010. Depending on implementation examples, the electronic apparatus 100 may identify whether a user input cancelling the first menu item is received within a threshold time after a user input selecting the first menu item was received.

Here, if a user input cancelling the first menu item selected by the user is not received in operation S1010-N, the electronic apparatus 100 may repeat the operations S1005 and S1010.

Here, if a user input cancelling the first menu item selected by the user is received in operation S1010-Y, the electronic apparatus 100 may provide guide information including a recommended menu item in operation S1015. As the operation of providing the guide information may correspond to S515 in FIG. 5, overlapping explanation will be omitted.

FIG. 11 is a diagram for illustrating an operation of acquiring context information.

Referring to FIG. 11, the electronic apparatus 100 may acquire context information according to various embodiments. In FIG. 11, a scenario in which an item to be cooked is already in the cooking chamber of the electronic apparatus 100 is illustrated. The item to be cooked may be inside a container, and the container may be placed on a support.

Referring to the embodiment 1110, the electronic apparatus 100 may sense a temperature through the sensor part 150. Here, the sensor part 150 may include at least one of a non-contact-type temperature sensor 151 or a contact-type temperature sensor 152. The non-contact-type temperature sensor 151 may sense the temperature inside the cooking chamber. Also, the contact-type temperature sensor 152 may sense the surface temperature of the item to be cooked or the temperature inside the item to be cooked. Here, the contact-type temperature sensor 152 may be implemented as a temperature probe.

The non-contact-type temperature sensor 151 or the contact-type temperature sensor 152 in FIG. 11 are described as protruding forms, but in actual implementation, they may be implemented in a form of being arranged on a wall surface of the cooking chamber or inside the upper plate of the cooking chamber, for protecting the sensor.

Referring to the embodiment 1120, the camera 160 of the electronic apparatus 100 may photograph at least one of a support, a container, or an item to be cooked.

A viewing angle may vary according to the type of the camera 160, but the camera 160 may be arranged such that it can photograph the entire areas inside the cooking chamber.

According to an embodiment, as described in FIG. 11, the camera 160 may be attached to a wall surface of the cooking chamber, and may be arranged while being tilted to the lower direction based on a specific angle. For example, the camera 160 may be arranged while being tilted to the lower direction by 45 degrees in a state of being attached to a wall surface of the cooking chamber.

According to another embodiment, the camera 160 may be attached to the upper plate (or the ceiling) of the cooking chamber, and may be arranged toward the lower direction based on a specific angle. For example, the camera 160 may be arranged toward the lower direction in a state of being attached to the upper plate of the cooking chamber.

The camera 160 in FIG. 11 is described as a protruding form, but in actual implementation, the camera 160 may be implemented in a form of being arranged on a wall surface of the cooking chamber or inside the upper plate of the cooking chamber, for protecting the camera lens.

Figure 12:
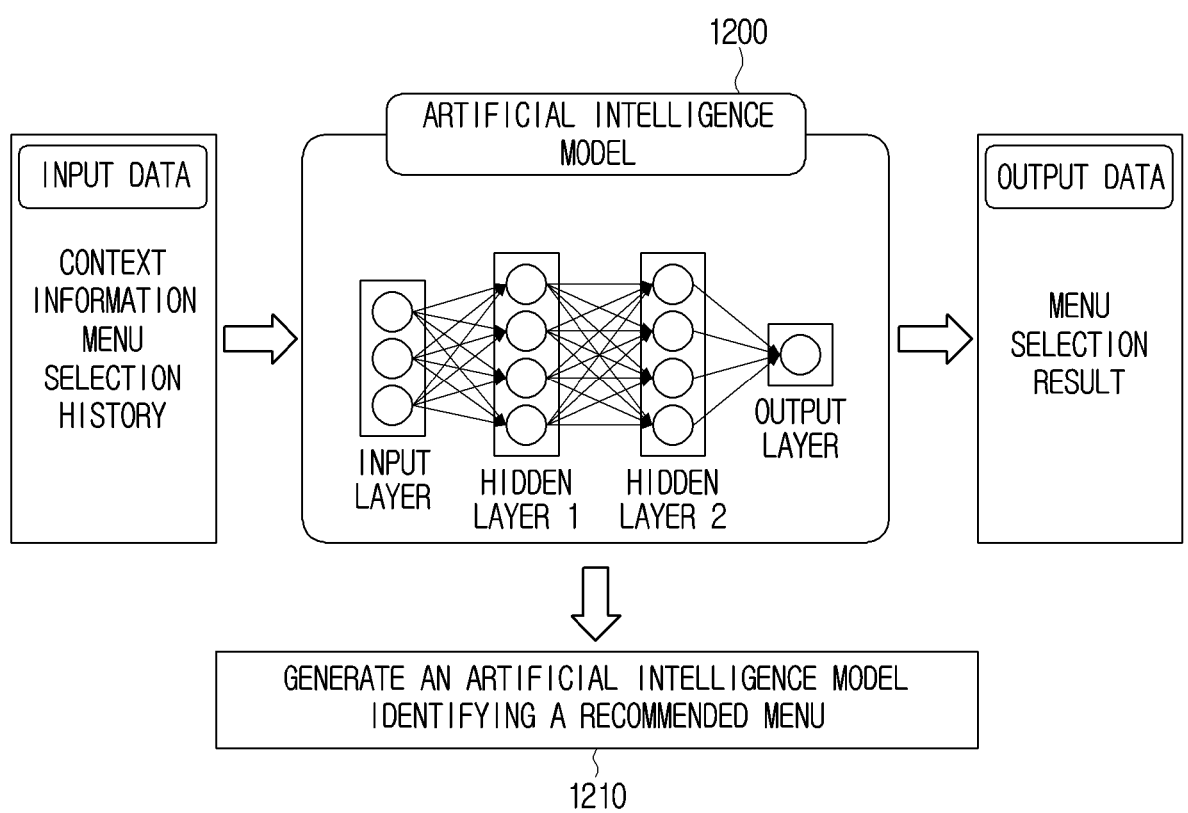
FIG. 12 is a diagram for illustrating an operation of acquiring an artificial intelligence model identifying a recommended menu.

FIG. 12 is a diagram for illustrating an operation of acquiring an artificial intelligence model identifying a recommended menu item.

Referring to FIG. 12, the electronic apparatus 100 may generate an artificial intelligence model 1210 identifying a recommended menu item. Specifically, the electronic apparatus 100 may train an artificial intelligence model 1200 based on learning data. Here, the learning data may be the context information, the menu selection history, and the menu selection result. The electronic apparatus 100 may train the artificial intelligence model 1200 such that the menu selection result can be derived based on the context information and the menu selection history.

For example, in a state wherein the electronic apparatus 100 is storing the menu selection history, the electronic apparatus 100 may analyze which menu item was selected ultimately in a situation wherein specific context information is acquired. Based on such an analysis result, the electronic apparatus 100 may receive input of a user input, the context information, and the menu selection history, and generate the artificial intelligence model 1210 identifying a recommended menu item.

Here, the artificial intelligence model 1200 is a model used in a process of performing learning, and the artificial intelligence model 1210 may mean a model of which learning was completed.

The electronic apparatus 100 may store the artificial intelligence model 1210 in the memory 130. Then, the electronic apparatus 100 may input a user input, the context information, and the menu selection history into the artificial intelligence model 1210, and identify a recommended menu item corresponding to the user input. Here, the input data of the artificial intelligence model 1210 may be a user input, the context information, and the menu selection history, and the output data of the artificial intelligence model 1210 may be a recommended menu item corresponding to the user input.

The artificial intelligence model 1200 and the artificial intelligence model 1210 may also be described as neural network models.

FIG. 13 is a diagram for illustrating menu items of different depths.

Referring to FIG. 13, the electronic apparatus 100 may store menu items of different depths. Here, the electronic apparatus 100 may include a menu 1310 of the first category at a first depth and a menu 1320 of the second category at a second depth. Here, the menu 1310 of the first depth may be an upper menu category of the menu 1320 of the second depth. Here, the menu 1320 of the second depth may be a lower menu category of the menu 1310 of the first depth. As the number of the depth is lower, the menu may be an upper menu.

For example, in the A menu, lower menu items #01, #02, #03, #04, #05, and #06 may exist. Also, in the B menu, lower menu items #11, #12, #13, #14, #15, and #16 may exist. In addition, in the C menu, lower menu items #21, #22, #01, #02, #11, and #12 may exist.

Here, menu items #01 and #02 which are lower menu items of the C menu may also be the lower menu items of the A menu. Also, menu items #11 and #12 which are lower menu items of the C menu may also be the lower menu items of the A menu. As such, according to some embodiment, some menu items may include overlapping items.

Figure 14:
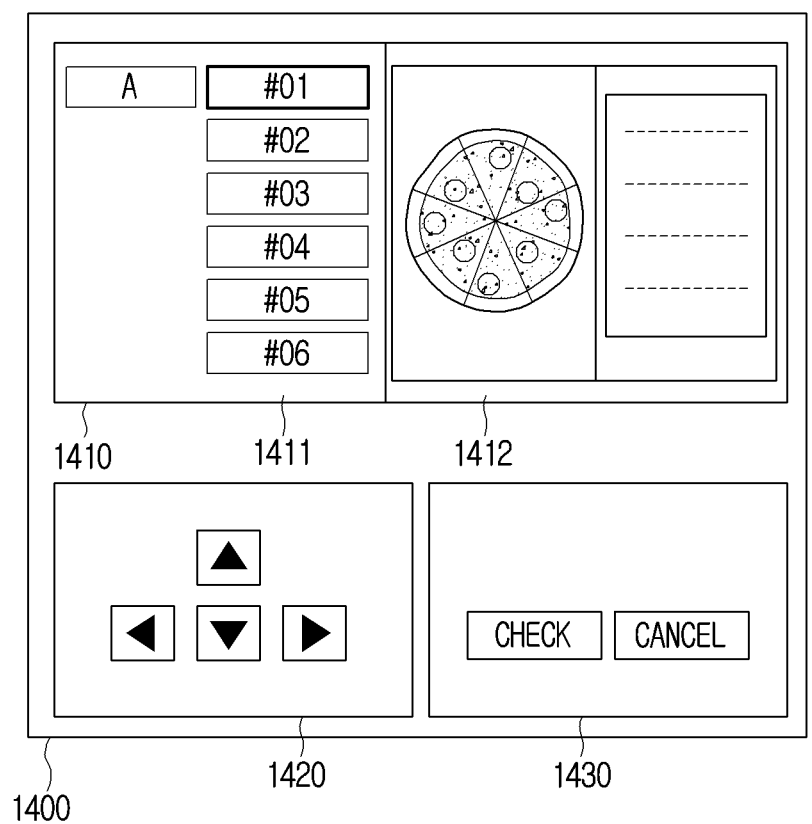
FIG. 14 is a diagram for illustrating a screen displayed when a specific menu item is selected.

FIG. 14 is a diagram for illustrating a screen displayed when a specific menu item is selected.

Referring to FIG. 14, the electronic apparatus 100 may display a screen 1400 related to a menu item on the display 110. Here, the screen 1400 may include at least one of a first area 1410 for displaying information related to a menu item, a second area 1420 including a UI for selecting (or moving) a menu item, or a third area 1430 including a UI for identifying or cancelling a selected (or moved) menu item.

Here, the first area 1410 may include at least one of an area 1411 displaying at least one menu item or an area 1412 displaying information related to the currently selected (or activated) menu item. Here, the information related to the currently selected (or activated) menu item may mean summary information related to a specific menu item. Here, the summary information may include at least one of a thumbnail image corresponding to the specific menu item or a summary text corresponding to the specific menu item. The area 1412 in FIG. 14 may be an area wherein summary information related to menu item #01 which is the currently selected (or activated) menu item is displayed.

Here, the second area 1420 may include a UI for moving a selected (or activated) menu item. Here, the UI for moving the selected (or activated) menu item may be a UI moving a menu item in upper, lower, left, and right directions.

Here, the third area 1430 may include at least one of a UI identifying the currently selected (or activated) menu item or a UI cancelling the currently selected (or activated) menu item. Here, if a user input is received through the UI identifying the currently selected (or activated) menu item, the electronic apparatus 100 may display a lower menu category of the currently selected (or activated) menu item. That is, the electronic apparatus 100 may display the detailed information of the currently selected (or activated) menu item. Also, if a user input is received through the UI cancelling the currently selected (or activated) menu item, the electronic apparatus 100 may display an upper menu category of the currently selected (or activated) menu item.

Figure 15:
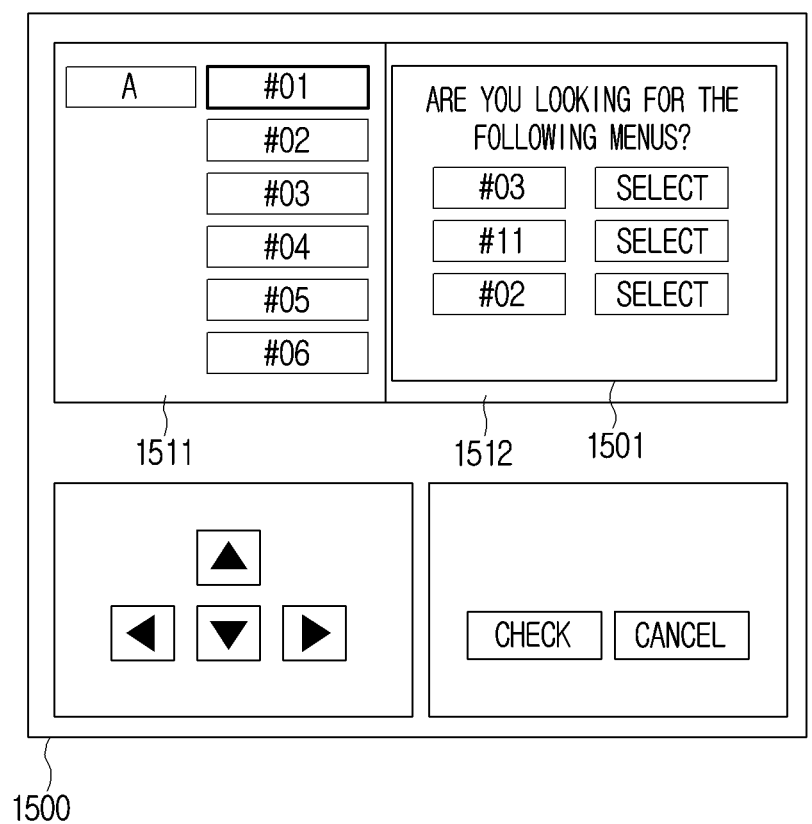
FIG. 15 is a diagram for illustrating an operation of providing guide information based on an event according to an embodiment of the disclosure.

FIG. 15 is a diagram for illustrating an operation of providing guide information based on a predetermined event according to an embodiment of the disclosure.

Referring to FIG. 15, the electronic apparatus 100 may display a screen 1500 providing a recommended menu item on the display 110.

Here, the screen 1500 may include at least one of an area 1511 displaying at least one menu item or an area 1512 displaying information related to the currently selected (or activated) menu item. Here, the area 1511 may correspond to the area 1411 in FIG. 14, and the area 1512 may correspond to the area 1412 in FIG. 14.

If it is determined that provision of guide information is necessary, the electronic apparatus 100 may display guide information 1501 including a recommended menu item in the area 1512. Here, as the guide information 1501 is displayed, the content that was previously displayed may not be seen.

Figure 16:
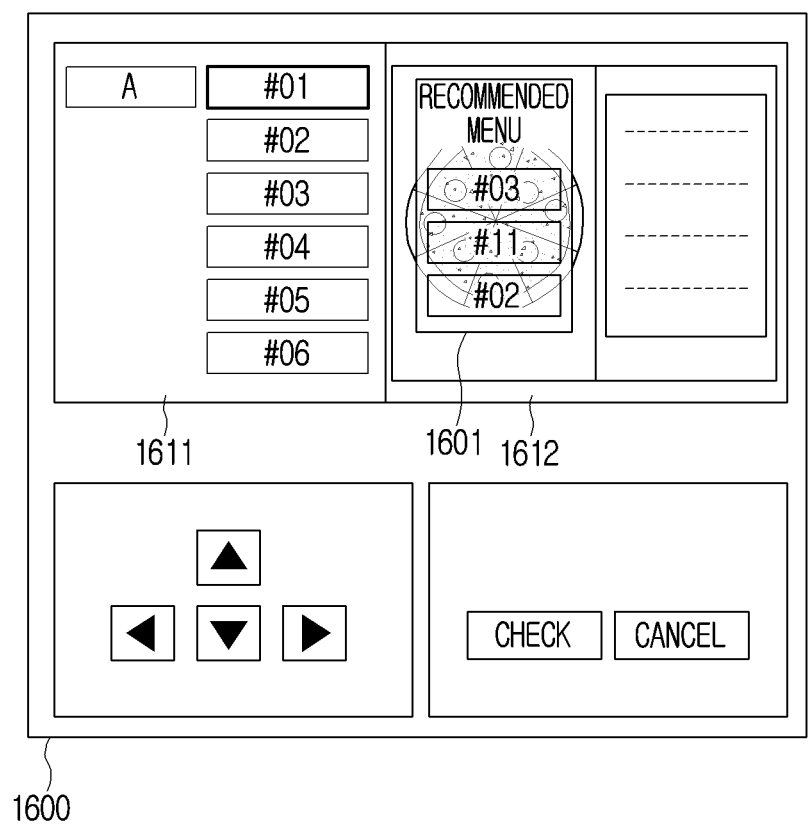
FIG. 16 is a diagram for illustrating an operation of providing guide information based on a predetermined event according to another embodiment of the disclosure.

FIG. 16 is a diagram for illustrating an operation of providing guide information based on a predetermined event according to another embodiment of the disclosure.

Referring to FIG. 16, the electronic apparatus 100 may display a screen 1600 providing a recommended menu item on the display 110.

Here, the screen 1600 may include at least one of an area 1611 displaying at least one menu item or an area 1612 displaying information related to the currently selected (or activated) menu item. Here, the area 1611 may correspond to the area 1411 in FIG. 14, and the area 1612 may correspond to the area 1412 in FIG. 14.

If it is determined that provision of guide information is necessary, the electronic apparatus 100 may display guide information 1601 including a recommended menu item in the area 1612. Here, the guide information 1601 may be displayed overlappingly on the previously displayed content. Accordingly, the user can intuitively figure out that a recommended menu item is being provided separately from the previously displayed content.

Figure 17:
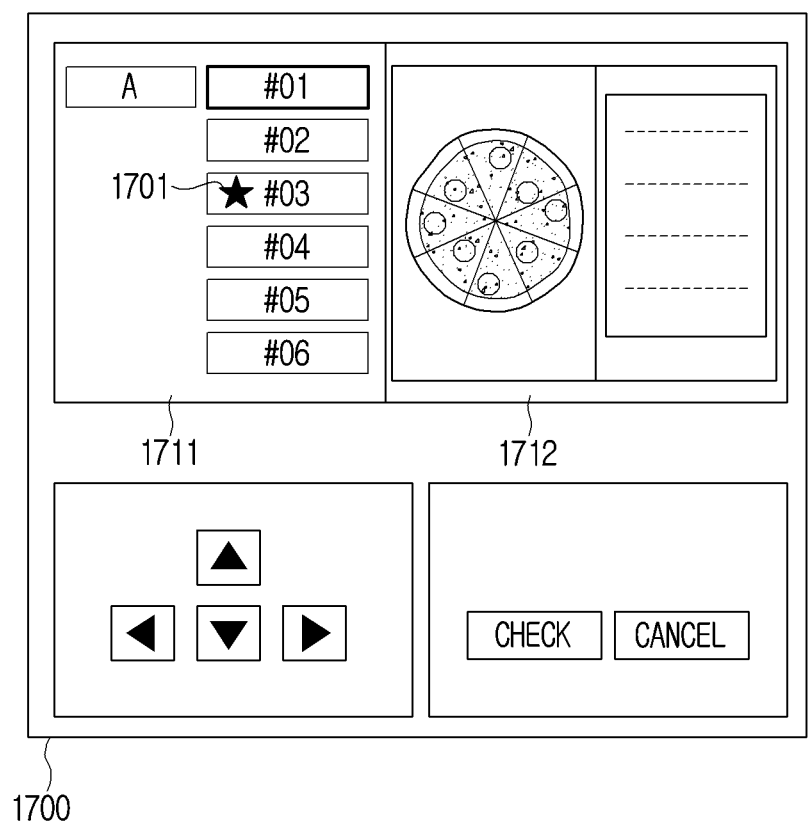
FIG. 17 is a diagram for illustrating an operation of providing guide information based on an event according to still another embodiment of the disclosure.

FIG. 17 is a diagram for illustrating an operation of providing guide information based on a predetermined event according to still another embodiment of the disclosure.

Referring to FIG. 17, the electronic apparatus 100 may display a screen 1700 providing a recommended menu item on the display 110.

Here, the screen 1700 may include at least one of an area 1711 displaying at least one menu item or an area 1712 displaying information related to the currently selected (or activated) menu item. Here, the area 1711 may correspond to the area 1411 in FIG. 14, and the area 1712 may correspond to the area 1412 in FIG. 14.

If it is determined that provision of guide information is necessary, the electronic apparatus 100 may additionally display an icon 1701 based on the location wherein the recommended menu item is displayed in the area 1711.

For example, it is assumed that the recommended menu item is menu item #03. The electronic apparatus 100 may display the icon 1701 in a location adjacent to the location wherein menu item #03 which is the recommended menu item is displayed. The user can intuitively figure out the recommended menu item through the icon 1701.

Figure 18:
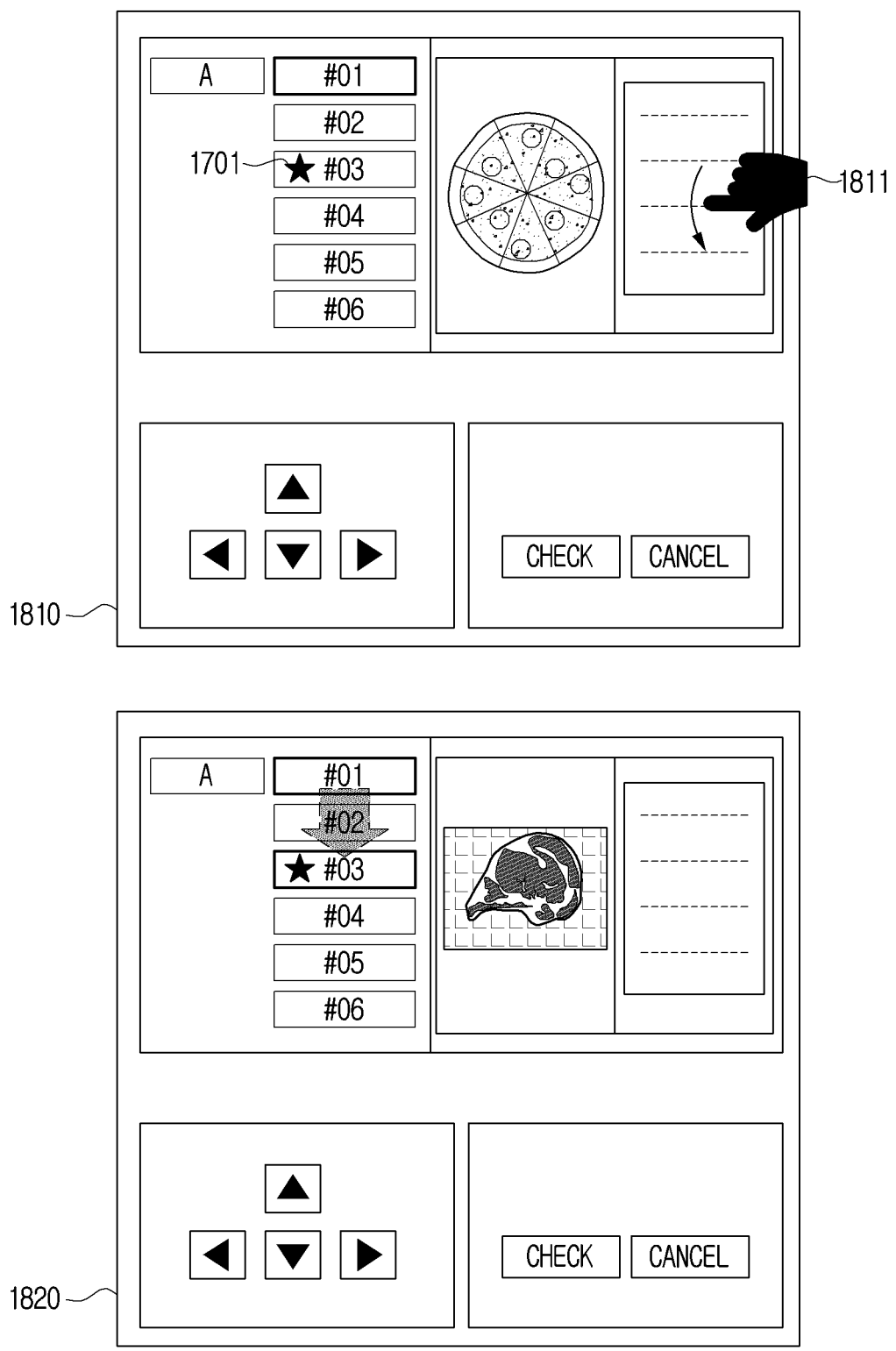
FIG. 18 is a diagram for illustrating an operation of displaying a recommended menu item.

FIG. 18 is a diagram for illustrating an operation of displaying a recommended menu item.

Referring to FIG. 18, the electronic apparatus 100 may display a screen 1810 providing a recommended menu item on the display 110. Here, the screen 1810 may correspond to the screen 1700 in FIG. 17.

It is assumed that, in a state wherein the screen 1810 is displayed on the display 110, a swipe input 1811 in a lower direction was received from the user. The electronic apparatus 100 may change the currently activated menu item #01 based on the swipe input 1811. Here, the electronic apparatus 100 may identify the most adjacent recommended menu items #03 to the menu item #01 that was activated through the swipe input 1811.

Then, the electronic apparatus 100 may display a screen 1820 including the recommended menu item #03 on the display 110. Here, the electronic apparatus 100 may display the menu item located in the middle item #02 before displaying the screen 1820 including the recommended menu item #03.

In a general embodiment, the swipe input 1811 may correspond to an input changing an activated menu item, and thus the electronic apparatus 100 may select (or activate) the menu items in the order of menu items #01, #02, #03, #04, #05, and #06. Here, the time that each menu item is displayed may be determined according to the input time of the swipe input 1811. If the input time of the swipe input 1811 is short, the time that each menu item is displayed may also be short.

According to an embodiment of the disclosure, the electronic apparatus 100 may fixedly display the recommended menu item #03 while displaying the plurality of menu items in order based on the swipe input 1811. That is, in a situation wherein menu items #01, #02, #03, #04, #05, and #06 should be displayed in order, if the recommended menu item #03 is identified, the electronic apparatus 100 may fixedly display the recommended menu item #03, and may not display the next menu items #04, #05, and #06 of the recommended menu item #03.

In another embodiment of the disclosure, the electronic apparatus 100 may display at least one menu item in order based on the swipe input 1811, and display the recommended menu item #03 for a longer time than the other menu items. That is, in a situation wherein menu items #01, #02, #03, #04, #05, and #06 should be displayed in order, if the recommended menu item #03 is identified midway, the electronic apparatus 100 may display the previous menu items #01, #02 of the recommended menu item #03 during a first time (e.g., 0.2 second), display the recommended menu item #03 during a second time (e.g., 1 second), and display the next menu items #04, #05, and #06 of the recommended menu item #03 during the first time (e.g., 0.2 second). Here, the second time may be bigger than the first time.

Figure 19:
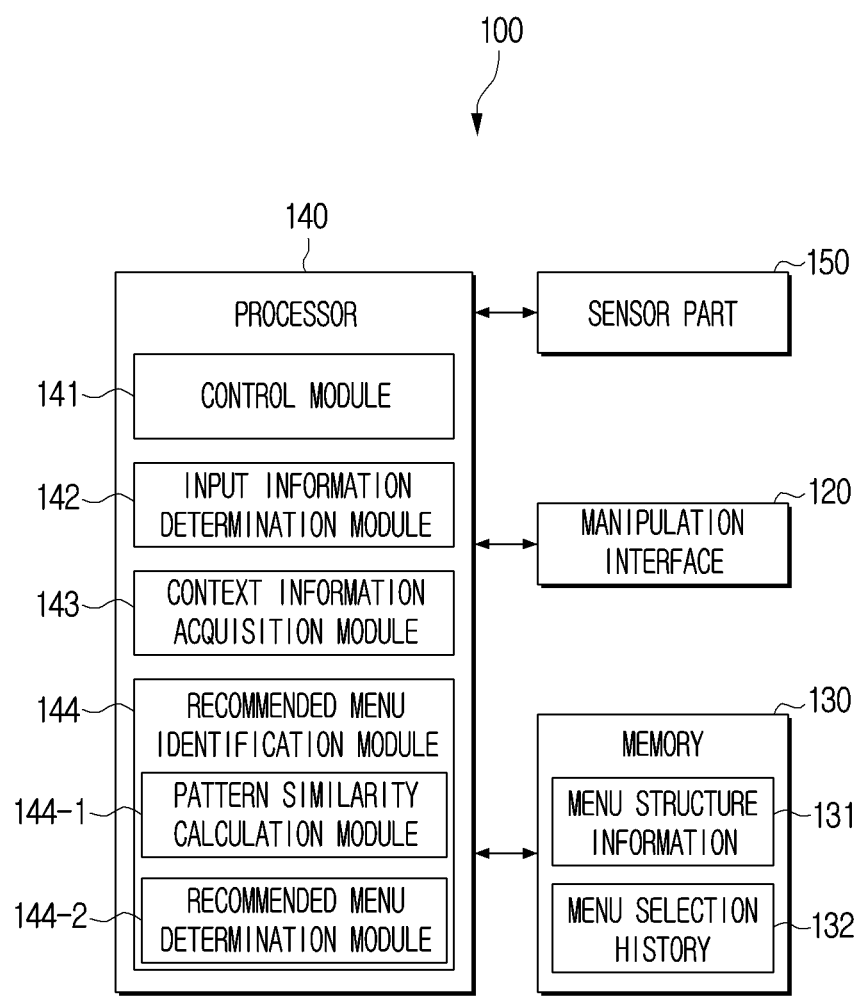
FIG. 19 is a block diagram for illustrating an operation of an electronic apparatus of generating a recommended menu item.

FIG. 19 is a block diagram for illustrating an operation of the electronic apparatus 100 of generating a recommended menu item.

Referring to FIG. 19, the electronic apparatus 100 may include the manipulation interface 120, the memory 130, the processor 140, and the sensor part 150.

Here, the processor 140 may include at least one of a control module 141, an input information determination module 142, a context information acquisition module 143, or a recommended menu item identification module 144. Here, the recommended menu item identification module 144 may include a pattern similarity calculation module 144-1 and a recommended menu item determination module 144-2.

Here, the memory 130 may store menu structure information 131 and menu selection history 132. Here, the menu structure information 131 may mean the structure of an upper menu category or a lower menu category. Explanation regarding the menu structure information 131 will be described in FIG. 13.

Here, the electronic apparatus 100 may receive a user input through the manipulation interface 120. The electronic apparatus 100 may transmit the user input received through the manipulation interface 120 to the control module 141. Then, the control module 141 may transmit the user input to the input information determination module 142.

Here, the input information determination module 142 may identify whether a predetermined event occurred based on the user input. If it is identified that a predetermined event occurred, the input information determination module 142 may transmit an event notification to the control module 141.

Here, the control module 141 may receive the event notification from the input information determination module 142. When the event notification is received, the control module 141 may request the context information to the sensor part 150. Then, the context information acquired through the sensor part 150 may be stored in the context information acquisition module 143. Also, when the event notification is received, the control module 141 may request the menu structure information 131 and the menu selection history 132 to the memory 130.

When the event notification is received, the recommended menu identification module 144 may acquire the user input acquired from the manipulation interface 120, the context information acquired through the sensor part 150, and the menu structure information 131 and the menu selection history 132 acquired through the memory 130. Then, the recommended menu identification module 144 may calculate pattern similarity for each of a plurality of patterns stored in the menu selection history 132 by using the pattern similarity calculation module 144-1. Here, the pattern similarity may mean a value indicating how similar a specific pattern stored in the menu selection history 132 and the user input are. Then, the pattern similarity calculated by the pattern similarity calculation module 144-1 may be transmitted to the recommended menu determination module 144-2. Here, the pattern similarity may also be described as a weight (or a summed-up weight).

Here, the recommended menu determination module 144-2 may identify (or determine) at least one recommended menu item corresponding to the user input based on the pattern similarity.

The detailed operations of the control module 141, the input information determination module 142, the context information acquisition module 143, the recommended menu identification module 144, etc. will be described in FIG. 22 to FIG. 24.

In FIG. 19, the context information acquisition module 143 was described, but depending on implementation examples, the context information acquisition module 143 may be omitted. In case the context information acquisition module 143 is omitted, the recommended menu identification module 144 may directly acquire the context information through the sensor part 150.

Figure 20:
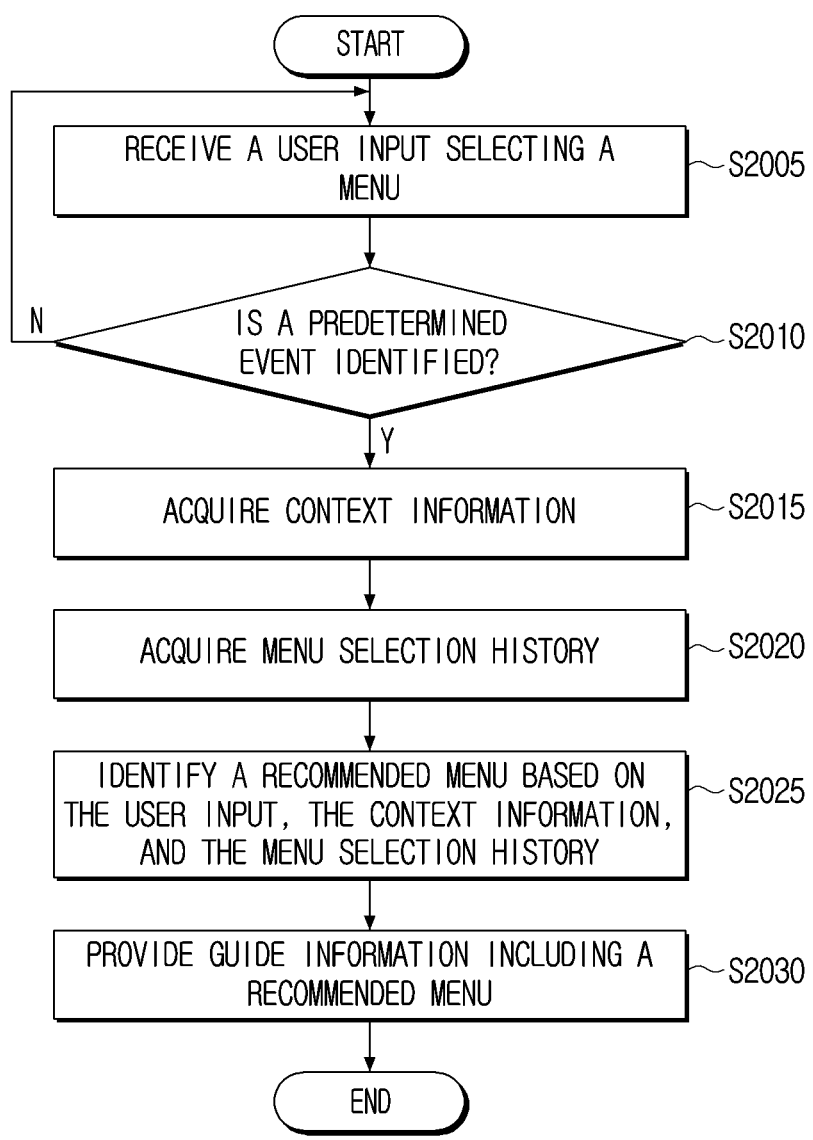
FIG. 20 is a flow chart for illustrating an operation of identifying a recommended menu item.

FIG. 20 is a flow chart for illustrating an operation of identifying a recommended menu item.

Referring to FIG. 20, the electronic apparatus 100 may receive a user input selecting a menu item in operation S2005. Then, the electronic apparatus 100 may identify a predetermined event in operation S2010. If a predetermined event is not identified in operation S2010-N, the electronic apparatus 100 may repeat the operations S2005 and S2010.

If a predetermined event is identified in operation S2010-Y, the electronic apparatus 100 may acquire the context information in operation S2015. Then, the electronic apparatus 100 may acquire the menu selection history in operation S2020. Then, the electronic apparatus 100 may identify a recommended menu item based on the user input, the context information, and the menu selection history in operation S2025. Here, the electronic apparatus 100 may identify the recommended menu item in further consideration of the menu structure information. Then, the electronic apparatus 100 may provide guide information including the recommended menu item in operation S2030. As the operation of providing the guide information may correspond to S515 in FIG. 5, overlapping explanation will be omitted.

Figure 21:
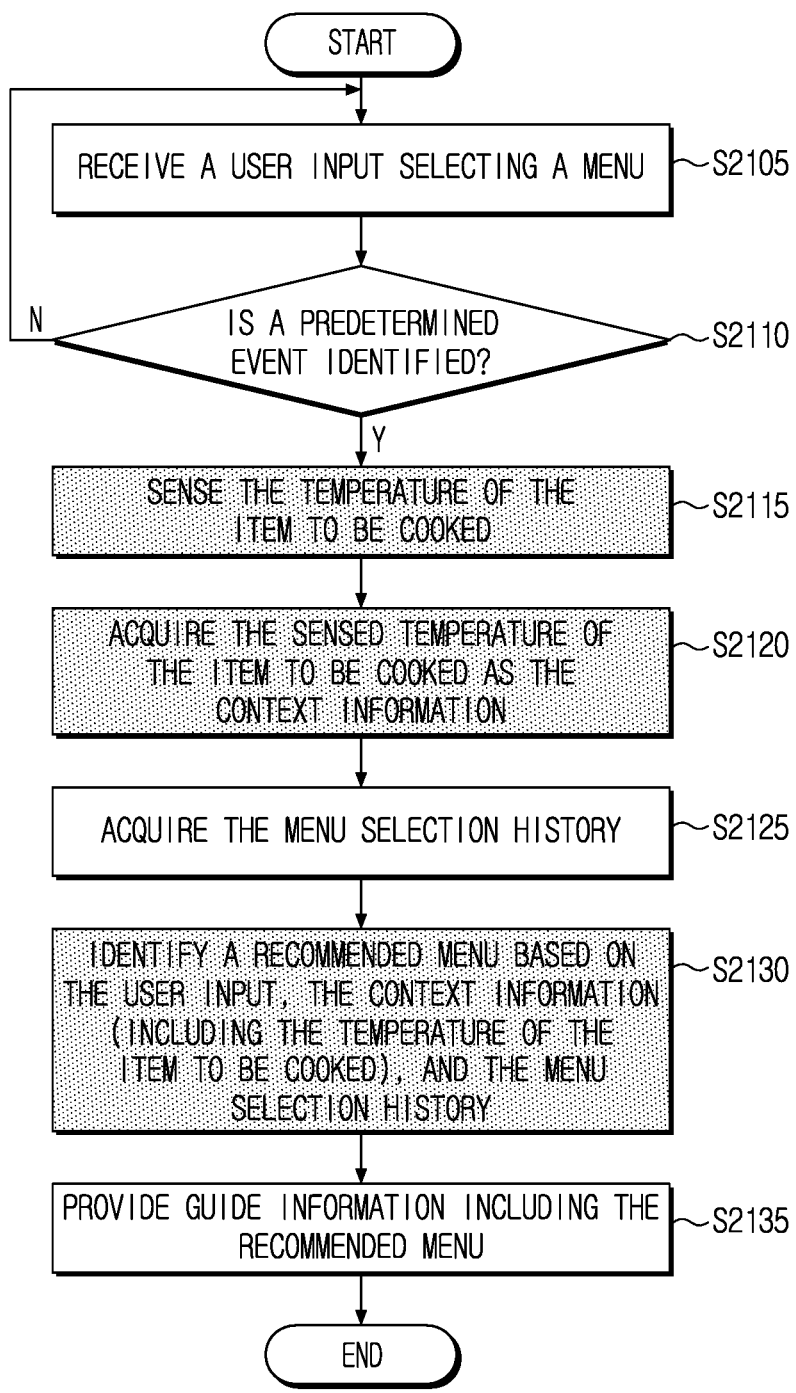
FIG. 21 is a flow chart for illustrating an operation of identifying a recommended menu item based on a temperature of an item to be cooked.

FIG. 21 is a flow chart for illustrating an operation of identifying a recommended menu item based on a temperature of an item to be cooked.

Referring to FIG. 21, the operations S2105 and S2110 may correspond to the operations S2005 and S2010 in FIG. 20, and thus overlapping explanation will be omitted.

Here, if a predetermined event is identified in operation S2110-Y, the electronic apparatus 100 may sense the temperature of the item to be cooked in operation S2115. Specifically, the electronic apparatus 100 may sense the temperature of the item to be cooked through the contact-type temperature sensor 152. Then, the electronic apparatus 100 may acquire the sensed temperature of the item to be cooked as the context information in operation S2120. Here, the context information may additionally include various information other than the temperature of the item to be cooked. Then, the electronic apparatus 100 may acquire the menu selection history in operation S2125. Then, the electronic apparatus 100 may identify a recommended menu item based on the user input, the context information including the temperature of the item to be cooked, and the menu selection history in operation S2130. Then, the electronic apparatus 100 may provide guide information including the recommended menu in operation S2135. As the operation of providing the guide information may correspond to S515 in FIG. 5, overlapping explanation will be omitted.

Figure 22:
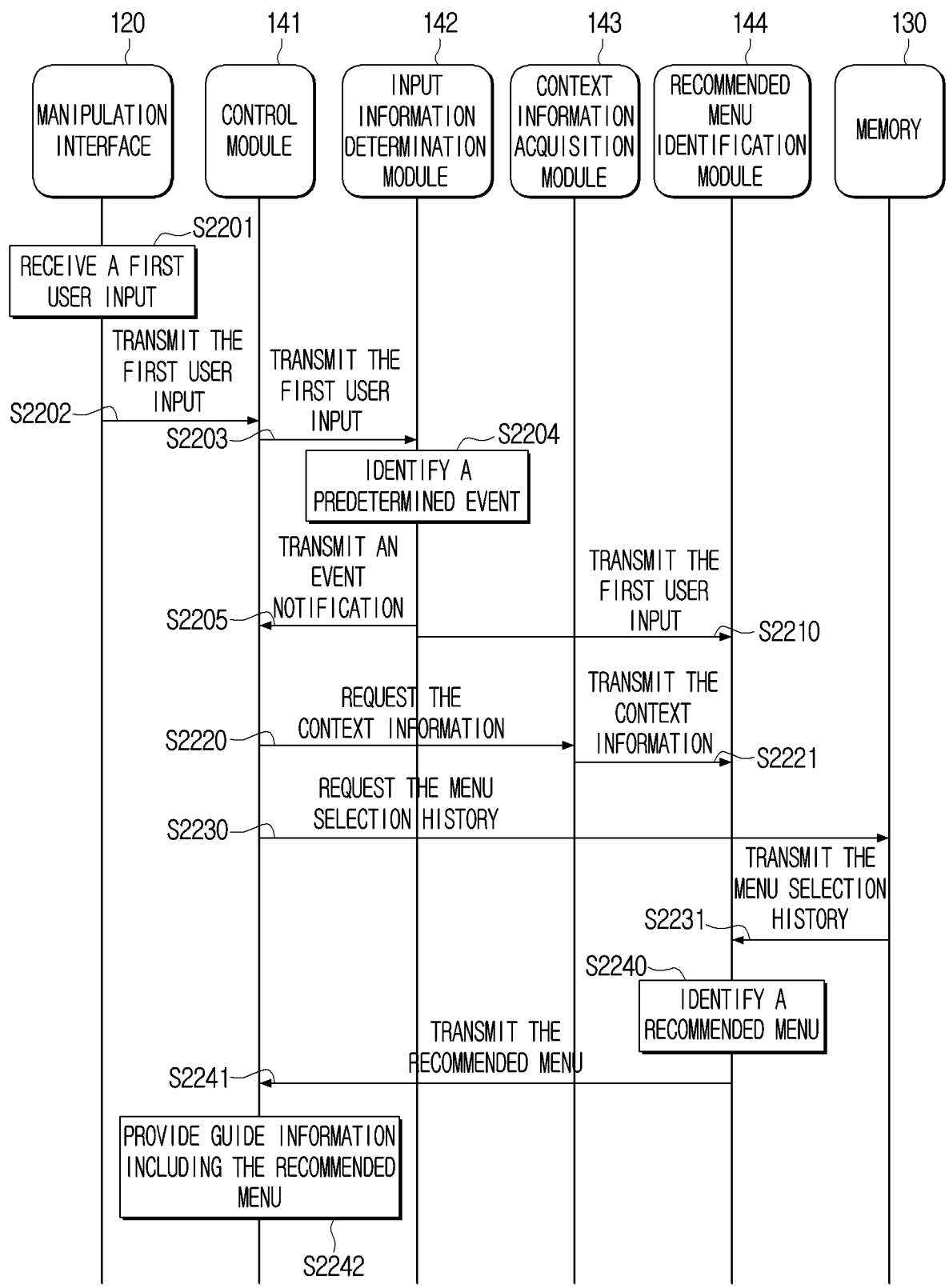
FIG. 22 is a flow chart for illustrating an operation of providing guide information by a plurality of modules included in an electronic apparatus according to an embodiment of the disclosure.

FIG. 22 is a flow chart for illustrating an operation of providing guide information by a plurality of modules included in the electronic apparatus 100 according to an embodiment of the disclosure.

Referring to FIG. 22, the manipulation interface 120 may receive a first user input in operation S2201. Then, the manipulation interface 120 may transmit the received first user input to the control module 141 in operation S2202. Then, the control module 141 may transmit the first user input received from the manipulation interface 120 to the input information determination module 142 in operation S2203.

The input information determination module 142 may receive the first user input from the control module 141. Then, the input information determination module 142 may identify a predetermined event based on the first user input in operation S2204. If a predetermined event is identified based on the first user input, the input information determination module 142 may transmit an event notification to the control module 141 in operation S2205. Then, the input information determination module 142 may transmit the first user input to the recommended menu identification module 144 in operation S2210.

According to an embodiment, the first user input transmitted in the operation S2210 may be the user input transmitted in the operation S2202. That is, the input information determination module 142 may transmit all information related to the received first user input to the recommended menu identification module 144.

According to another embodiment, the input information determination module 142 may transmit only some information in the received first user input to the recommended menu identification module 144. Here, the some information may mean information related to the menu items used in the recommended menu item.

The control module 141 may receive an event notification from the input information determination module 142.

When an event notification is received, the control module 141 may request context information to the context information acquisition module 143 in operation S2220. Specifically, the control module 141 may transmit a control signal for requesting context information to the context information acquisition module 143. Then, the context information acquisition module 143 may transmit the control signal to the sensor part 150, and receive context information from the sensor part 150. Then, the context information acquisition module 143 may transmit the context information to the recommended menu item identification module 144 in operation S2221.

When an event notification is received, the control module 141 may request menu selection history to the memory 130 in operation S2230. Specifically, the control module 141 may transmit a control signal for requesting menu selection history to the memory 130. Here, the memory 130 may receive the request for menu selection history from the control module 141. Then, the memory 130 may transmit the menu selection history to the recommended menu identification module 144 in operation S2231.

The recommended menu identification module 144 may identify a recommended menu item based on the first user input acquired through the operation S2210, the context information acquired through the operation S2221, and the menu selection history acquired through the operation S2231 in operation S2240. Then, the recommended menu identification module 144 may transmit the identified recommended menu item to the control module 141 in operation S2241.

The control module 141 may receive the recommended menu item from the recommended menu identification module 144. Then, the control module 141 may provide guide information including the recommended menu item in operation S2242.

The disclosure is not limited to the order of operation illustrated in FIG. 22. As such, according to another embodiment, the order of operation of may be different. According to yet another embodiment, one or more operations may be omitted or added.

In FIG. 22, an operation that the context information and the menu selection history are transmitted directly to the recommended menu identification module 144 without going through the control module 141 was described. However, according to a different implementation example, the context information and the menu selection history may be transmitted to the recommended menu identification module 144 by going through the control module 141. Explanation in this regard will be described in FIG. 23.

Figure 23:
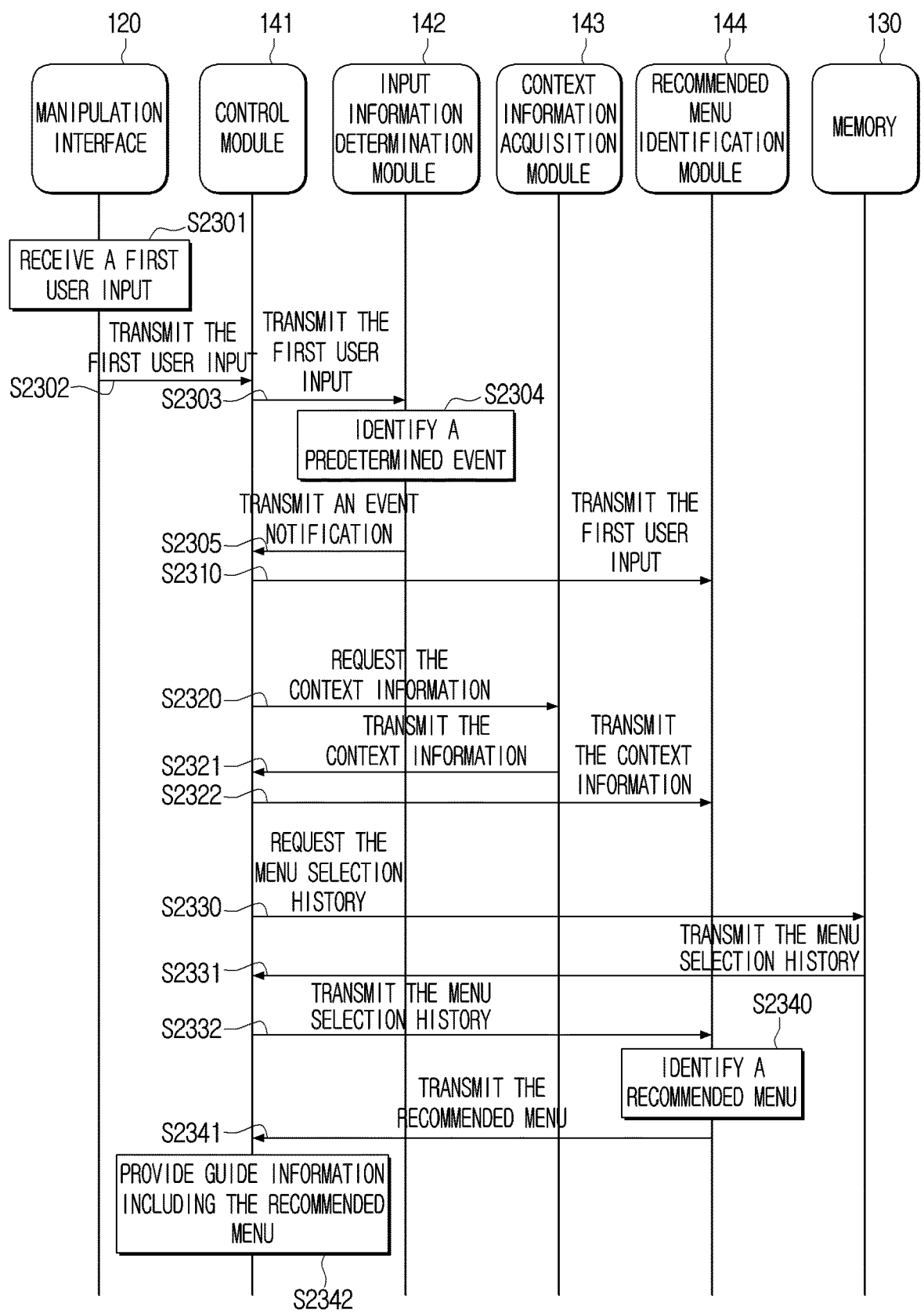
FIG. 23 is a flow chart for illustrating an operation of providing guide information by a plurality of modules included in an electronic apparatus according to another embodiment of the disclosure.

FIG. 23 is a flow chart for illustrating an operation of providing guide information by a plurality of modules included in the electronic apparatus 100 according to another embodiment of the disclosure.

Referring to FIG. 23, the operations S2301, S2302, S2303, S2304, S2305, S2341, and S2342 may correspond to the operations S2201, S2202, S2203, S2204, S2205, S2241, and S2242 in FIG. 22, and thus overlapping explanation will be omitted.

Here, when an event notification is received, the control module 141 may transmit the first user input to the recommended menu identification module 144 in operation S2310. Unlike in FIG. 22, the first user input may be transmitted to the recommended menu identification module 144 by going through the control module 141.

Here, when an event notification is received, the control module 141 may request context information to the context information acquisition module 143 in operation S2320. Then, the context information acquisition module 143 may acquire the context information through the sensor part 150. Then, the context information acquisition module 143 may transmit the context information to the control module 141 in operation S2321. Then, the control module 141 may transmit the context information acquired from the context information acquisition module 143 to the recommended menu identification module 144 in operation S2322.

Here, when an event notification is received, the control module 141 may request menu selection history to the memory 130 in operation S2330. Then, the memory 130 may transmit the menu selection history to the control module 141 in operation S2331. Then, the control module 141 may transmit the menu selection history to the recommended menu identification module 144 in operation S2332.

The recommended menu identification module 144 may identify a recommended menu item based on the first user input acquired through the operation S2310, the context information acquired through the operation S2322, and the menu selection history acquired through the operation S2332 in operation S2340. Then, the recommended menu identification module 144 may transmit the recommended menu item to the control module 141 in operation S2341. Then, the control module 141 may provide guide information including the recommended menu item in operation S2342.

Figure 24:
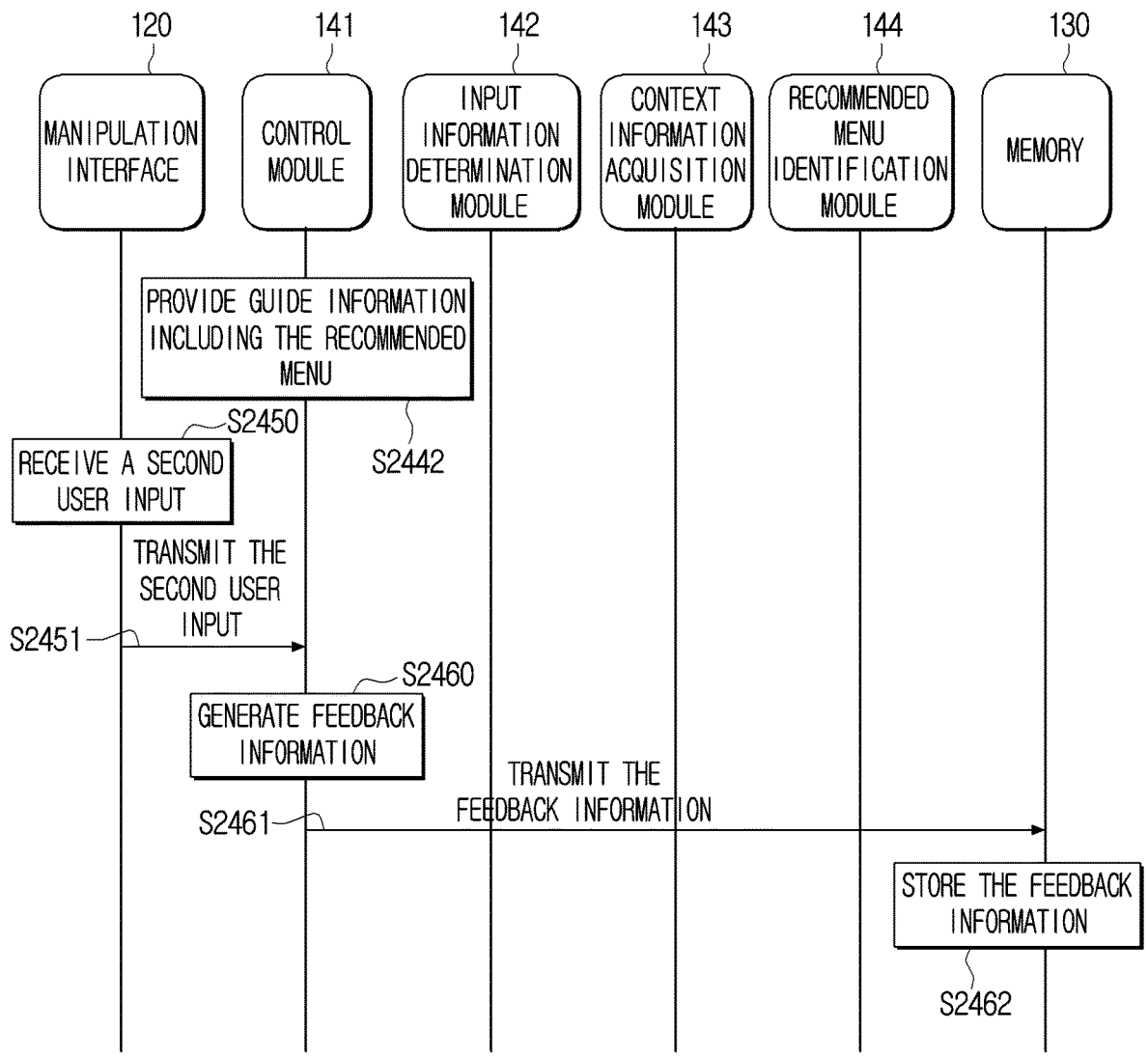
FIG. 24 is a flow chart for illustrating an operation of storing feedback information after guide information is provided.

FIG. 24 is a flow chart for illustrating an operation of storing feedback information after guide information is provided.

Referring to FIG. 24, the control module 141 may provide guide information including a recommended menu item in operation S2442. The operation S2442 may correspond to the operation S2242 in FIG. 22 or the operation S2342 in FIG. 23. That is, the operation in FIG. 24 describes an operation after the operation of providing guide information.

After guide information including a recommended menu item is provided, the manipulation interface 120 may receive a second user input selecting the recommended menu item in operation S2450. Then, the manipulation interface 120 may transmit the second user input to the control module 141 in operation S2451.

Here, the electronic apparatus 100 may receive the second user input through the manipulation interface 120. Then, the control module 141 may analyze which recommended menu item was selected by the user based on the second user input. Then, the control module 141 may generate feedback information based on the second user input in operation S2460. Here, the feedback information may include information regarding whether the recommended menu item was selected. The control module 141 may transmit the feedback information to the memory 130 in operation S2461. Then, the memory 130 may store the feedback information received from the control module 141 in operation S2462.

The control module 141 may identify a menu item preferred by the user based on the feedback information, and additionally use the feedback information while identifying a recommended menu item.

FIG. 25 is a flow chart for illustrating an operation of identifying a recommended menu item by using the server 200.

Referring to FIG. 25, the electronic apparatus 100 may acquire a recommended menu item through the server 200. The server 200 may store menu structure information and menu selection history in operation S2505.

Here, the electronic apparatus 100 may receive a user input in operation S2510. When a user input is received, the electronic apparatus 100 may transmit the user input to the server in operation S2515.

Here, the server 200 may receive the user input from the electronic apparatus 100. Then, the server 200 may identify a predetermined event based on the user input in operation S2520. If a predetermined event is identified, the server 200 may transmit an event notification to the electronic apparatus 100 in operation S2525.

Here, the electronic apparatus 100 may receive the event notification from the server 200. Then, when the event notification is received, the electronic apparatus 100 may acquire context information in operation S2530. Then, the electronic apparatus 100 may transmit the context information to the server 200 in operation S2535.

Here, the server 200 may receive the context information from the electronic apparatus 100. Then, the server 200 may identify a recommended menu item based on the user input acquired in the operation S2515, the context information acquired in the operation S2535, and the menu structure information and the menu selection history acquired in the operation S2505 in operation S2540. Then, the server 200 may transmit the recommended menu item to the electronic apparatus 100 in operation S2545.

Here, the electronic apparatus 100 may receive the recommended menu item from the server 200. Then, the electronic apparatus 100 may provide guide information including the recommended menu item in operation S2550.

FIG. 26 is a table for illustrating weight information corresponding to each of a plurality of cooking.

Referring to FIG. 26, the table 2610 may include weight information regarding menu items. Here, the menu items may be divided based on cooking identification information. The weight information may include weights corresponding to a plurality of items. Here, the plurality of items may include at least one of a category, an associated category, an internal temperature inside (the cooking chamber), a probe temperature, whether Function 1 is performed, whether Function 2 is performed, the time, the date, or the selection history.

The electronic apparatus 100 may acquire the currently selected (or activated) menu item based on a user input. Then, the electronic apparatus 100 may grant a weight to a category corresponding to the currently selected menu item. Also, the electronic apparatus 100 may grant a weight to an associated category corresponding to the currently selected menu item.

The electronic apparatus 100 may acquire context information. Here, the context information may include at least one of an internal temperature inside (the cooking chamber), a probe temperature (of an item to be cooked), whether Function 1 is performed, whether Function 2 is performed, the current time, or the current date. Here, the electronic apparatus 100 may grant a weight corresponding to the context information.

The electronic apparatus 100 may acquire menu selection history. Here, the menu selection history may include information indicating which menu item was selected by the user. Here, the electronic apparatus 100 may grant a weight to a menu item which has history of having been selected by the user.

For example, as menu item #01 is included in the A menu, when the A menu is selected, the electronic apparatus 100 may grant a weight corresponding to the category. Also, as the associated category of menu item #01 falls under the B menu, when the B menu is selected, the electronic apparatus 100 may grant a weight corresponding to the associated category. In addition, menu item #01 may be a menu item that operates in a situation wherein the temperature of the cooking chamber is greater than or equal to a threshold temperature. Accordingly, if the temperature of the cooking chamber is greater than or equal to the threshold temperature, the electronic apparatus 100 may grant a weight corresponding to the internal temperature. Also, menu item #01 may be a menu item wherein Function 1 should be performed. Accordingly, if it is a state that Function 1 has been executed, the electronic apparatus 100 may grant a weight corresponding to Function 1. Further, menu item #01 may be a menu item that is mainly used in the morning times. Accordingly, if the current time is the morning, the electronic apparatus 100 may grant a weight corresponding to the time. Also, menu item #01 may be a menu item that is mainly used on weekdays. Accordingly, if the current date is a weekday, the electronic apparatus 100 may grant a weight corresponding to the date. For methods of granting a weight related to menu items #02 to #23, similar methods to menu item #01 may be applied, and thus explanation in that regard will be omitted.

Weights corresponding to the plurality of respective items may be different. For example, the electronic apparatus 100 may grant a weight of 60 to a category, a weight of 30 to an associated category, a weight of 5 to an internal temperature, a weight of 5 to a probe temperature, a weight of 5 to Function 1, a weight of 5 to Function 2, a weight of 5 to a time, a weight of 5 to a date, and a weight of 40 to the selection history.

A process of calculating weights for the plurality of respective items will be described in FIG. 27.

FIG. 27 is a diagram for illustrating an operation of identifying a recommended menu item based on weight information.

Referring to FIG. 27, the table 2710 may include weight results corresponding to a plurality of menu items. The electronic apparatus 100 may acquire user input information 2701, context information 2702, and menu selection history 2703. Here, the user input information 2701 may include information that the user selected the A category. Here, it is assumed that a predetermined event was identified after the user selected the A category.

Also, it is assumed that the context information 2702 is the internal temperature not identified, the probe temperature identified, performing of Function 1, non-performing of Function 2, evening, weekend, and Christmas. The internal temperature not identified may mean a state that the inside of the cooking chamber is not heated. If the internal temperature is lower than a first threshold temperature, the electronic apparatus 100 may determine that "the internal temperature is not identified." Also, the probe temperature identified may mean a state that the item to be cooked is not heated. If the probe temperature is greater than or equal to a second threshold temperature, the electronic apparatus 100 may determine that "the probe temperature was identified."

Also, it is assumed that the menu selection history 2703 includes the history that the user selected menu items #03, #11, #12, and #13.

Here, the electronic apparatus 100 may determine that the currently selected menu item is A based on the user input information 2701. Accordingly, the electronic apparatus 100 may grant a weight 60 corresponding to the category to menu items #01, #02, and #03. Also, the electronic apparatus 100 may grant a weight 30 corresponding to the associated category to menu items #11 and #21.

Here, the electronic apparatus 100 may grant a weight based on the context information 2702. As the internal temperature was not identified, the electronic apparatus 100 may not grant a weight 5 corresponding to the internal temperature. Also, as the probe temperature was identified, the electronic apparatus 100 may grant a weight 5 corresponding to the probe temperature to menu items #21, #22, and #23. In addition, as Function 1 was performed, the electronic apparatus may grant a weight 5 regarding Function 1 to menu items #01, #03, #11, #13, #21, and #23. Further, as Function 2 was not performed, the electronic apparatus 100 may not grant a weight 5 regarding Function 2. Also, as the current time is the evening, the electronic apparatus 100 may grant a weight 5 corresponding to the time to menu items #03, #13, and #23. In addition, as the current date is a weekend, the electronic apparatus 100 may grant a weight 5 corresponding to the date to menu items #02, #03, #12, #13, #22, and #23. Here, as the current date is Christmas, the electronic apparatus 100 may additionally grant a weight 5 regarding a specific holiday separately from the weight regarding a weekend. The electronic apparatus 100 may additionally grant a weight 5 corresponding to Christmas to menu items #03, #13, and #23.

Here, the electronic apparatus 100 may grant a weight based on the menu selection history 2703. The menu selection history 2703 may indicate that the user selected menu items #03, #11, #12, and #13. Accordingly, the electronic apparatus 100 may grant a weight 40 corresponding to the selection history to menu items #03, #11, #12, and #13.

The electronic apparatus 100 may calculate weights corresponding to the plurality of respective menu items according to the aforementioned method. Then, the electronic apparatus 100 may identify a recommended menu item based on the calculated weights.

For example, the electronic apparatus 100 may identify the menu item having the biggest weight menu item #03 as a recommended menu item.

As another example, the electronic apparatus 100 may identify menu items of a threshold number (e.g., four) in the order of having bigger weights as recommended menu items #03, #11, #01, and #02. Here, if the threshold number is three, menu items #01 and #02 are in the same rank. In case there are menu items in the same rank, the electronic apparatus 100 may identify recommended menu items according to the priority information. The priorities may be higher in the order of the category, the selection history, the associated category, the internal temperature, the probe temperature, whether Function 1 is performed, whether Function 2 is performed, the time, and the date. Accordingly, in the table 2710, the priority of #01 may be higher. Accordingly, in case three recommended menu items are identified, the electronic apparatus 100 may identify menu items #03, #11, and #01 as recommended menu items.

Figure 28:
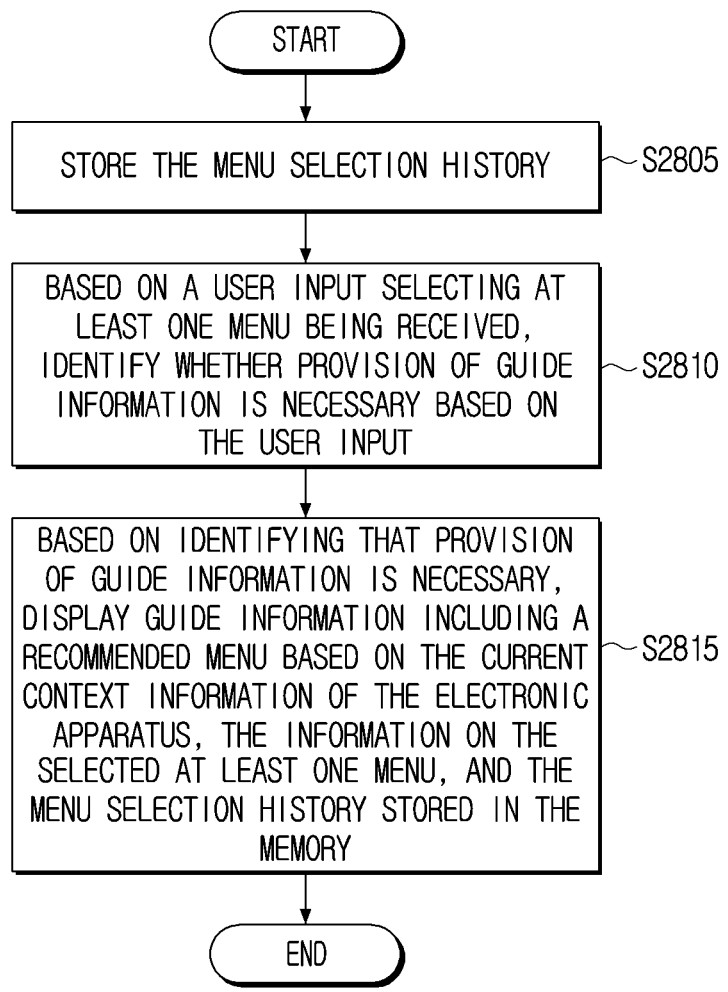
FIG. 28 is a diagram for illustrating a controlling method of an electronic apparatus according to an embodiment of the disclosure.

FIG. 28 is a diagram for illustrating a controlling method of the electronic apparatus 100 according to an embodiment of the disclosure.

Referring to FIG. 28, a controlling method of the electronic apparatus 100 includes the operations of storing menu selection history including a first menu item of a first category of a first depth and a second menu item of a second category of a second depth subordinate to the first menu item (S2805), based on receiving a user input selecting at least one menu item, identifying whether provision of guide information is necessary based on the user input (S2810), and based on identifying that provision of the guide information is necessary, displaying the guide information including a recommended menu item based on information on the selected at least one menu item, information on the current context of the electronic apparatus 100, and the stored menu selection history (S2815).

In the operation of identifying whether provision of guide information is necessary (S2810), if at least one event is identified among an event that an additional user input selecting a menu item is not received during a threshold time after a menu item of a specific depth was selected, an event that a speed that a menu item is changed according to a user input is greater than or equal to a threshold speed, or an event that a user input cancelling the menu selection is received after a menu item of a specific depth was selected, it may be identified that provision of the guide information is necessary.

The context information may include at least one of temperature information inside the electronic apparatus 100, temperature information of an item to be cooked, information on whether a specific function is executed, image information inside the electronic apparatus 100, or date and time information.

The controlling method may further include the operations of acquiring weights corresponding to a plurality of respective menu items stored in the electronic apparatus 100 based on the information on the at least one menu item, the context information, and the menu selection history, and identifying the recommended menu item based on the weights corresponding to the plurality of respective menu items.

In the operation of acquiring weights corresponding to the plurality of respective menu items, a selected menu item may be identified based on the information on the at least one menu item, a first sub weight may be allotted to the same menu item as the selected menu item among the plurality of menu items, a second sub weight may be allotted to a similar menu item to the selected menu item among the plurality of menu items, and the first sub weight and the second sub weight may be summed up, and weights corresponding to the plurality of respective menu items may be acquired.

In the operation of acquiring weights corresponding to the plurality of respective menu items, a third sub weight may be allotted to a menu item corresponding to the context information among the plurality of menu items, a fourth sub weight may be allotted to a menu item corresponding to the menu selection history among the plurality of menu items, and the first sub weight, the second sub weight, the third sub weight, and the fourth sub weight may be summed up, and weights corresponding to the plurality of respective menu items may be acquired.

The controlling method may further include the operations of, based on identifying that provision of the guide information is necessary, identifying the recommended menu item based on the information on the at least one menu item, the context information, and the menu selection history, and displaying an icon for identifying the recommended menu item based on a location wherein the recommended menu item is displayed.

The controlling method may further include the step of, based on identifying that provision of the guide information is necessary, inputting the information on the at least one menu item and the context information of the electronic apparatus 100 into a trained neural network model, and acquiring the recommended menu item, and the neural network model may be trained based on the context information and the menu selection history.

The electronic apparatus 100 may be a cooking apparatus including a heater heating an item to be cooked, and the controlling method may further include the step of, based on receiving a user input selecting a menu item included in the guide information, performing a function corresponding to the selected menu item, and the function corresponding to the selected menu item may include at least one of a function of displaying a text including a cooking process of the selected menu item, a function of displaying an image including the cooking process of the selected menu item, or a function of setting a schedule of the heater to perform the cooking process of the selected menu item.

The electronic apparatus 100 may include a contact-type temperature sensor 152 for sensing a temperature of an item to be cooked, and the controlling method may further include the operations of, based on identifying that provision of the guide information is necessary, acquiring the temperature of the item to be cooked as the context information through the contact-type temperature sensor 152, and identifying the recommended menu item based on the information on the at least one menu item, the context information including the temperature of the item to be cooked, and the menu selection history.

The controlling method of the electronic apparatus as in FIG. 28 can be executed on an electronic apparatus having the configuration as in FIG. 3 or FIG. 4, and it can also be executed on electronic apparatuses having other configurations.

The methods according to the aforementioned various embodiments of the disclosure can be implemented in forms of applications that can be installed on conventional electronic apparatuses.

Also, the methods according to the aforementioned various embodiments of the disclosure may be implemented just with software upgrade, or hardware upgrade of conventional electronic apparatuses.

In addition, the aforementioned various embodiments of the disclosure may be performed through an embedded server provided on an electronic apparatus, or an external server of at least one of an electronic apparatus or a display apparatus.

According to an embodiment of the disclosure, the various embodiments described above may be implemented as software including instructions stored in machine-readable storage media, which can be read by machines (e.g.: computers). Here, the machines refer to apparatuses that call instructions stored in a storage medium, and can operate according to the called instructions, and the apparatuses may include an electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment, the methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may include a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

The invention claimed is:

1. An electronic apparatus comprising:
a display;
a manipulation interface;
a memory configured to store a menu selection history comprising a first menu category of a first depth and a second menu category of a second depth subordinate to the first menu category; and
a processor configured to:
identify whether guide information is to be provided based on identifying at least one event occurring in relation to a user input selecting a first menu item received through the manipulation interface,
obtain a recommended menu item based on the first menu item, the menu selection history stored in the memory, and context information comprising at least one of current temperature information inside the electronic apparatus or current temperature information of an item to be cooked, and
based on identifying the guide information is to be provided, control the display to display the guide information comprising the recommended menu item,
wherein the at least one event comprises a first event, which occurs when a speed at which menu items are changed according to user inputs is greater than or equal to a threshold speed, or a second event, which occurs when a user selects to cancel a menu selection.

2. The electronic apparatus of claim 1, wherein the at least one event comprises a third event, which occurs when an additional user input for selecting a second menu item is not received during a threshold time after the first item was selected.

3. The electronic apparatus of claim 1, wherein the context information further comprises at least one of information on whether a specific function is executed, image information inside the electronic apparatus, or date and time information.

4. The electronic apparatus of claim 3, wherein the memory is further configured to store a plurality of menu items, and
wherein the processor is further configured to:
acquire weights corresponding to the plurality of menu items stored in the memory based on the information on the first menu item, the context information, and the menu selection history, and
identify the recommended menu item based on the weights corresponding to the plurality of menu items.

5. The electronic apparatus of claim 4, wherein the processor is further configured to:
identify a selected menu item based on the first menu item,
allot a first sub weight to a same menu item as the selected menu item among the plurality of menu items,
allot a second sub weight to a similar menu item to the selected menu item among the plurality of menu items, and sum up the first sub weight and the second sub weight to acquire the weights corresponding to the plurality of menu items.

6. The electronic apparatus of claim 5, wherein the processor is further configured to:
identify a third sub weight to a menu item corresponding to the context information among the plurality of menu items,
identify a fourth sub weight to a menu item corresponding to the menu selection history among the plurality of menu items, and
sum up the first sub weight, the second sub weight, the third sub weight, and the fourth sub weight, to acquire the weights corresponding to the plurality of menu items.

7. The electronic apparatus of claim 1, wherein the processor is further configured to:
based on identifying that the guide information is to be provided, identify the recommended menu item based on the first menu item, and the menu selection history, and
control the display to display an icon for identifying the recommended menu item based on a location wherein the recommended menu item is displayed.

8. The electronic apparatus of claim 1, wherein the processor is further configured to, based on identifying that the guide information is to be provided, input the first menu item and the context information into a trained neural network model, and acquire the recommended menu item, and wherein the trained neural network model is trained based on the context information and the menu selection history.

9. The electronic apparatus of claim 1, wherein the electronic apparatus further comprises a heater configured to heat an item to be cooked, and
wherein the processor is further configured to:
based on an additional user input selecting a second menu item included in the guide information received through the manipulation interface, perform a function corresponding to the selected second menu item, and
the function corresponding to the selected second menu item comprises:
at least one of a function of displaying a text including a cooking process of the selected second menu item, a function of displaying an image including the cooking process of the selected second menu item, or a function of setting a schedule of the heater to perform the cooking process of the selected second menu item.

10. The electronic apparatus of claim 9, further comprising:
a contact-type temperature sensor configured to sense a temperature of the item to be cooked as the current temperature information of the item to be cooked.

11. The electronic apparatus of claim 1, wherein the at least one event occurs when an additional user input for selecting a second menu item is not received during a threshold time after the first item was selected.

12. The electronic apparatus of claim 1, wherein the at least one event comprises the first event.

13. The electronic apparatus of claim 1, wherein the at least one event comprises the second event.

14. The electronic apparatus of claim 1, wherein the processor is further configured to:
control the electronic apparatus to start a cooking process of the recommended menu item based on an additional user input selecting the recommended menu item.

15. The electronic apparatus of claim 1, wherein the recommended menu item is obtained prior to an initiation of a cooking operation by the electronic apparatus.

16. A controlling method of an electronic apparatus, the controlling method comprising:
storing a menu selection history comprising a first menu category of a first depth and a second menu category of a second depth subordinate to the first menu category;
identifying whether guide information is to be provided based on identifying at least one event occurring in relation to a user input selecting a first menu item;
obtaining a recommended menu item based on the first menu item, the menu selection history stored in a memory, and context information comprising at least one of current temperature information inside the electronic apparatus or current temperature information of an item to be cooked; and
based on identifying that the guide information is to be provided, displaying the guide information comprising the recommended menu item,
wherein the at least one event comprises a first event, which occurs when a speed at which menu items are changed according to user inputs is greater than or equal to a threshold speed, or a second event, which occurs when a user selects to cancel a menu selection.

17. The controlling method of claim 16, wherein the at least one event comprises a first third event, which occurs when an additional user input for selecting a second menu item is not received during a threshold time after the first item was selected.

18. The controlling method of claim 16, wherein the context information further comprises at least one of information on whether a specific function is executed, image information inside the electronic apparatus, or date and time information.

19. The controlling method of claim 16, further comprising:
acquiring weights corresponding to a plurality of menu items stored in the memory based on the information on the first menu item, and the menu selection history, and
identifying the recommended menu item based on the weights corresponding to the plurality of menu items.

20. The controlling method of claim 19, wherein the acquiring the weights corresponding to the plurality of menu items comprises:
identifying a selected menu item based on the first menu item,
allotting a first sub weight to a same menu item as the selected menu item among the plurality of menu items,
allotting a second sub weight to a similar menu item to the selected menu item among the plurality of menu items, and
summing up the first sub weight and the second sub weight to acquire the weights corresponding to the plurality of menu items.

* * * * *